(12) United States Patent
Unsworth

(10) Patent No.: US 8,224,485 B2
(45) Date of Patent: Jul. 17, 2012

(54) SNAKING ROBOTIC ARM WITH MOVABLE SHAPERS

(75) Inventor: John Unsworth, Hamilton (CA)

(73) Assignee: Titan Medical Inc., Toronto, Ontario (CA)

( * ) Notice: Subject to any disclaimer, the term of this patent is extended or adjusted under 35 U.S.C. 154(b) by 450 days.

(21) Appl. No.: 12/227,582

(22) PCT Filed: May 24, 2007

(86) PCT No.: PCT/CA2007/000930
§ 371 (c)(1),
(2), (4) Date: May 14, 2009

(87) PCT Pub. No.: WO2007/134461
PCT Pub. Date: Nov. 29, 2007

(65) Prior Publication Data
US 2010/0030377 A1 Feb. 4, 2010

(51) Int. Cl.
*G06F 19/00* (2011.01)
(52) U.S. Cl. ......................... 700/245; 700/253
(58) Field of Classification Search ................ None
See application file for complete search history.

(56) References Cited

U.S. PATENT DOCUMENTS

| | | | | |
|---|---|---|---|---|
| 3,274,850 A * | 9/1966 | Tascio | ........................ | 74/502.3 |
| 3,284,964 A * | 11/1966 | Saito | ........................ | 52/2.22 |
| 4,393,728 A * | 7/1983 | Larson et al. | ........................ | 74/469 |
| 4,494,417 A * | 1/1985 | Larson et al. | ........................ | 74/469 |
| 4,621,965 A * | 11/1986 | Wilcock | ........................ | 414/7 |
| 4,689,538 A * | 8/1987 | Sakaguchi et al. | ........................ | 318/568.21 |
| 4,784,042 A * | 11/1988 | Paynter | ........................ | 91/534 |
| 4,815,911 A * | 3/1989 | Bengtsson et al. | ........................ | 414/7 |
| 4,977,790 A * | 12/1990 | Nishi et al. | ........................ | 74/490.04 |
| 5,317,952 A * | 6/1994 | Immega | ........................ | 91/418 |
| 5,697,285 A * | 12/1997 | Nappi et al. | ........................ | 91/519 |
| 6,772,673 B2 * | 8/2004 | Seto et al. | ........................ | 92/92 |
| 7,042,184 B2 * | 5/2006 | Oleynikov et al. | ........................ | 318/568.12 |
| 7,086,322 B2 * | 8/2006 | Schulz | ........................ | 92/42 |
| 7,543,518 B2 * | 6/2009 | Buckingham et al. | ........................ | 74/490.05 |
| 2005/0131390 A1 * | 6/2005 | Heinrich et al. | ........................ | 606/1 |

* cited by examiner

*Primary Examiner* — Khoi Tran
*Assistant Examiner* — Bhavesh V Amin
(74) *Attorney, Agent, or Firm* — Perry + Currier Inc.

(57) ABSTRACT

Presented is a method and apparatus comprising one or more robotic members which are curvaceous or snake-like; having movable shapers through which may pass an articulable column having successive joints formed of alternating ball and socket members. The shapers can be directed up and down the articulable column, to create virtually any radius of curvature, in any direction. The robotic member may also include discrete microelectronic mechanical devices (MEMS) shapers with embedded addressable controllers. Thus the device, with computerized control is capable of negotiating a tortuous path to access the site of a given operation and to retreat along the same path, without injury to the body in which the arm is directed. Once at the work site, the articulating columns, or parts of them, may be put in compression, causing them to become rigid.

24 Claims, 17 Drawing Sheets

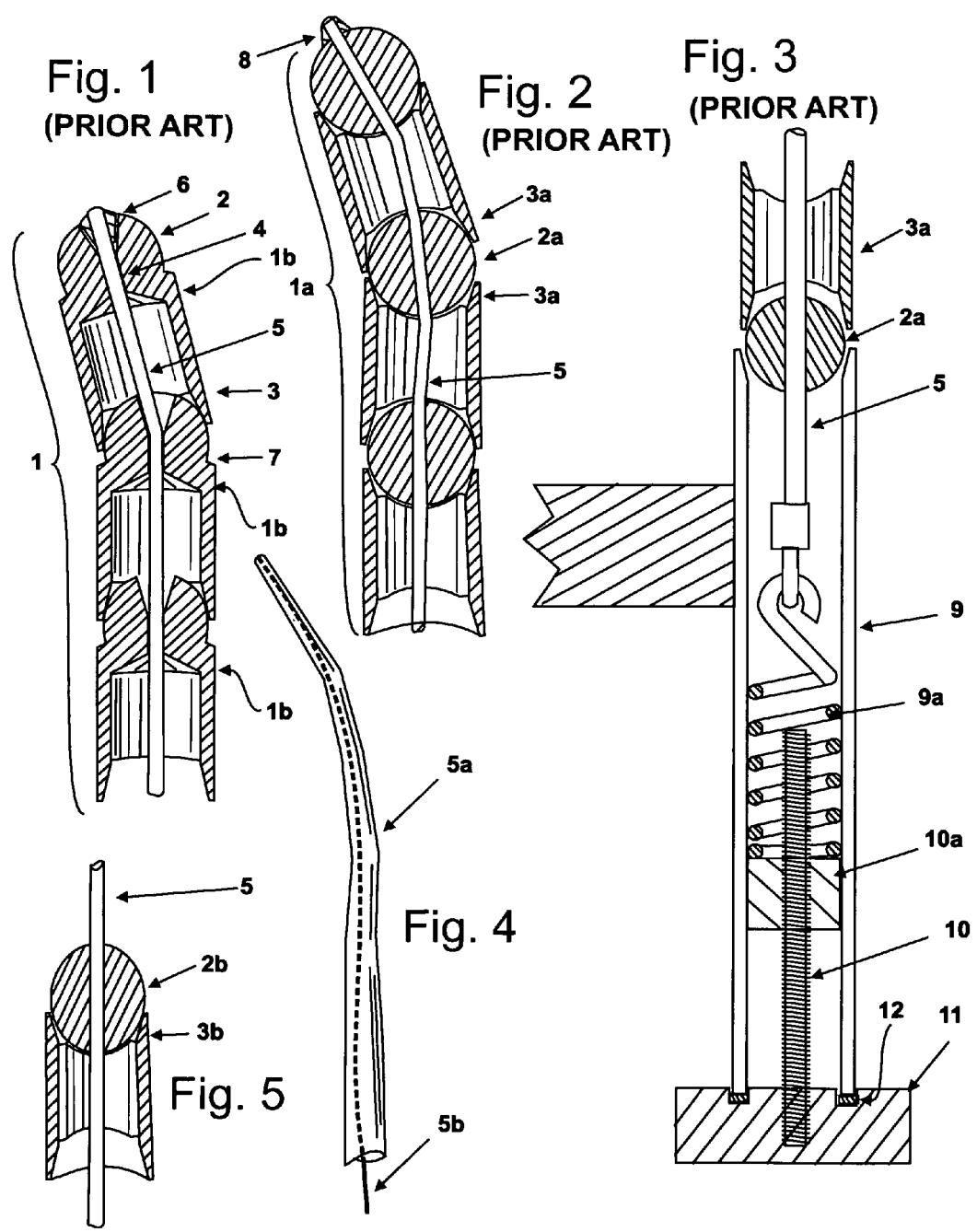

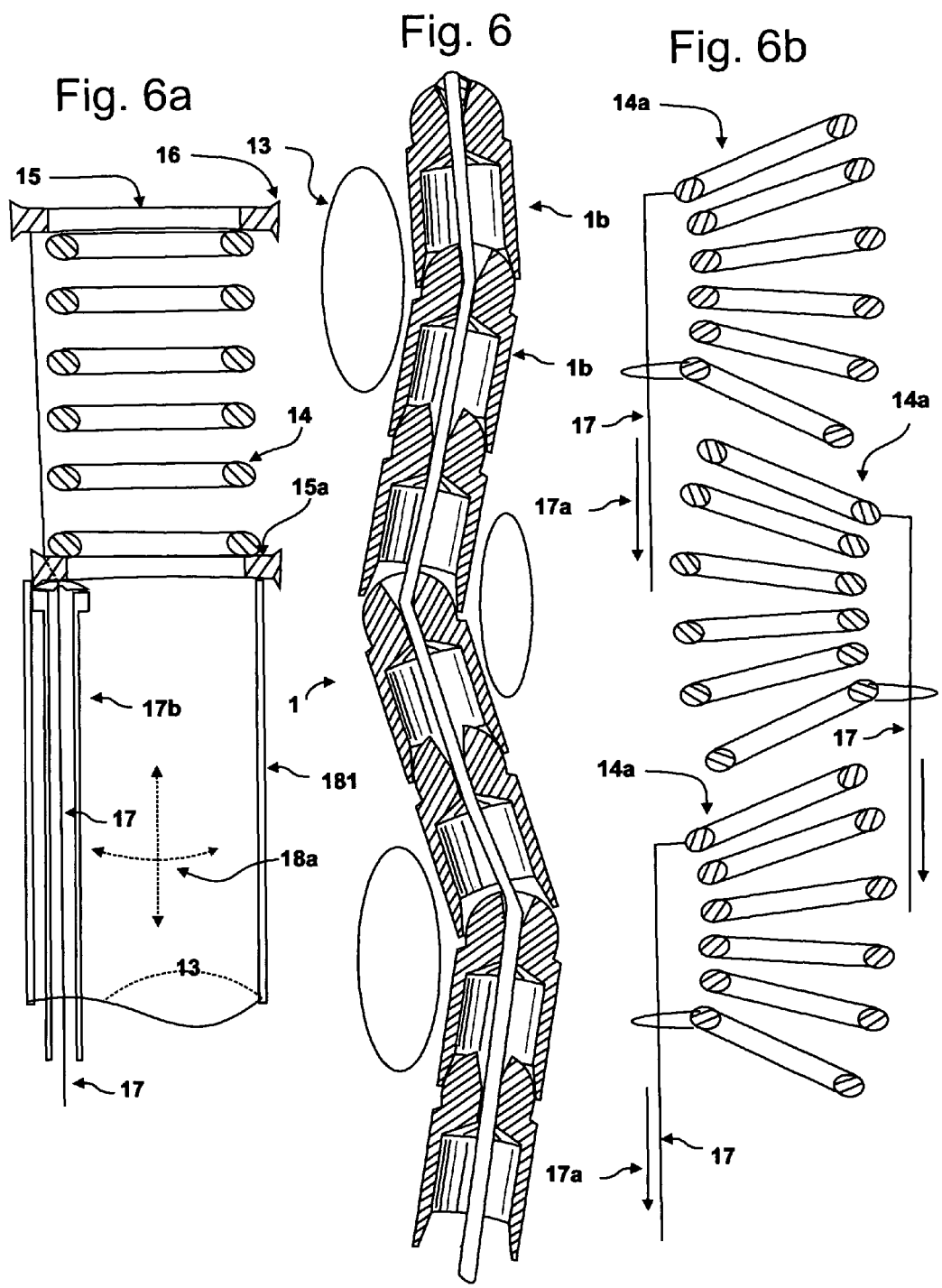

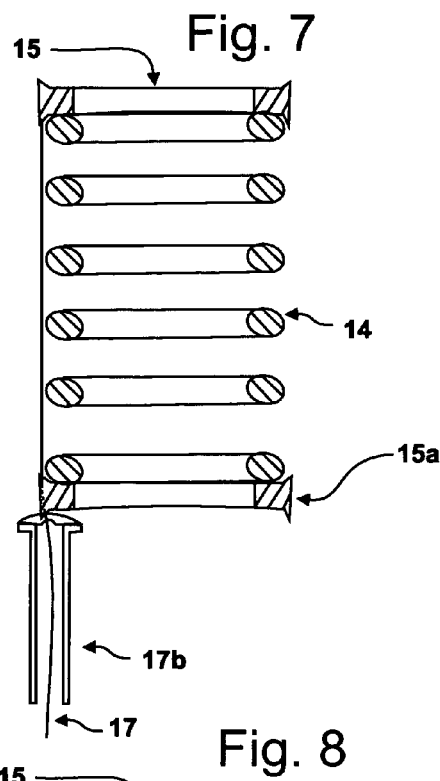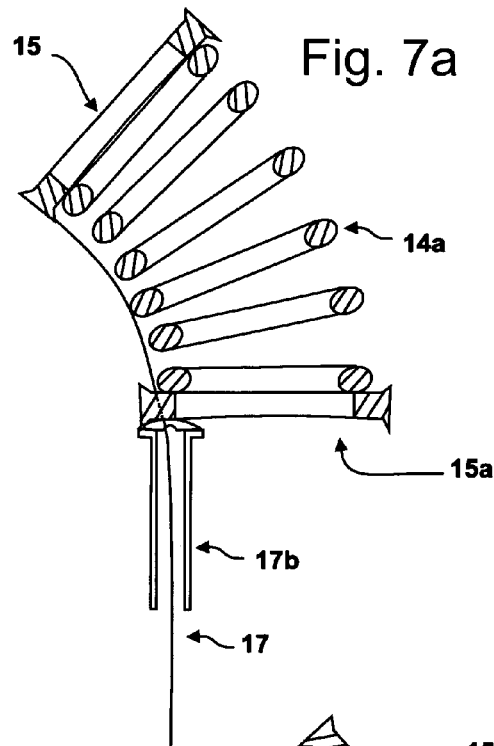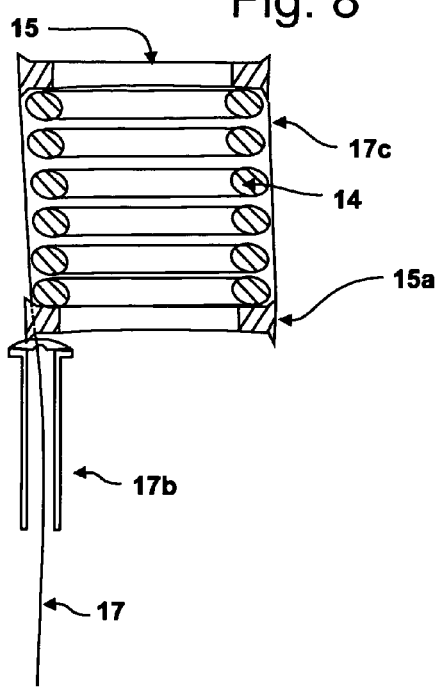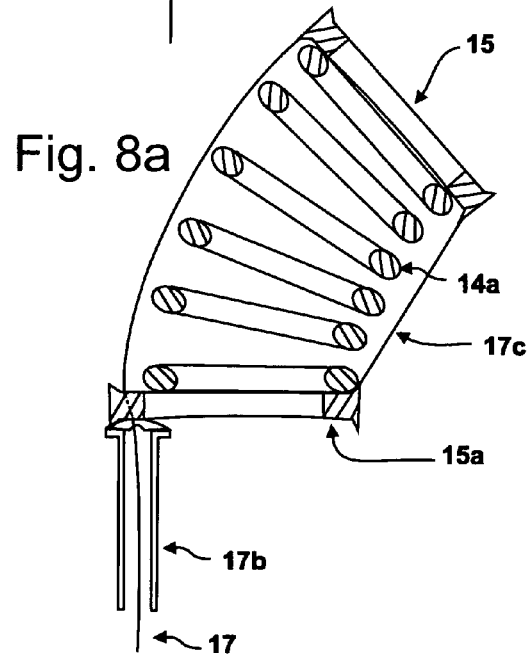

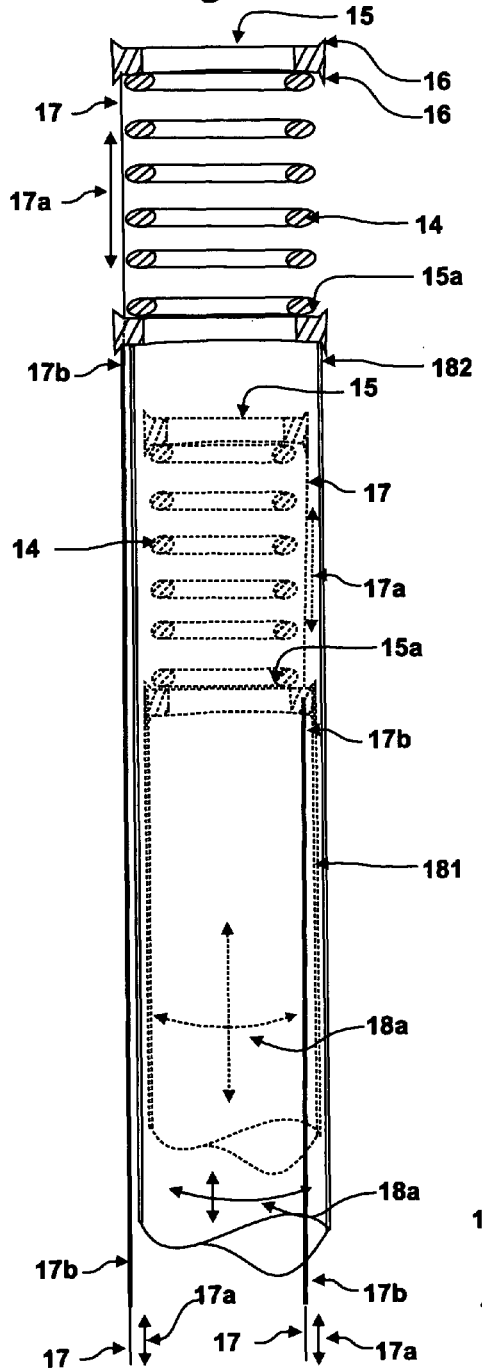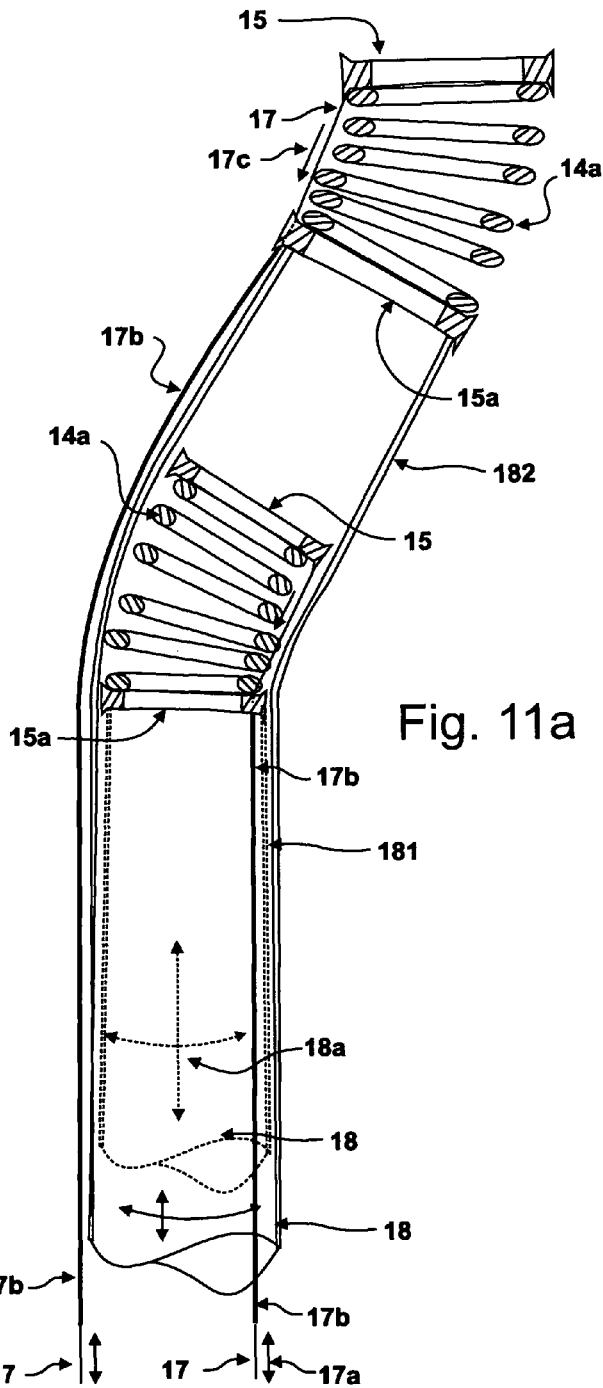

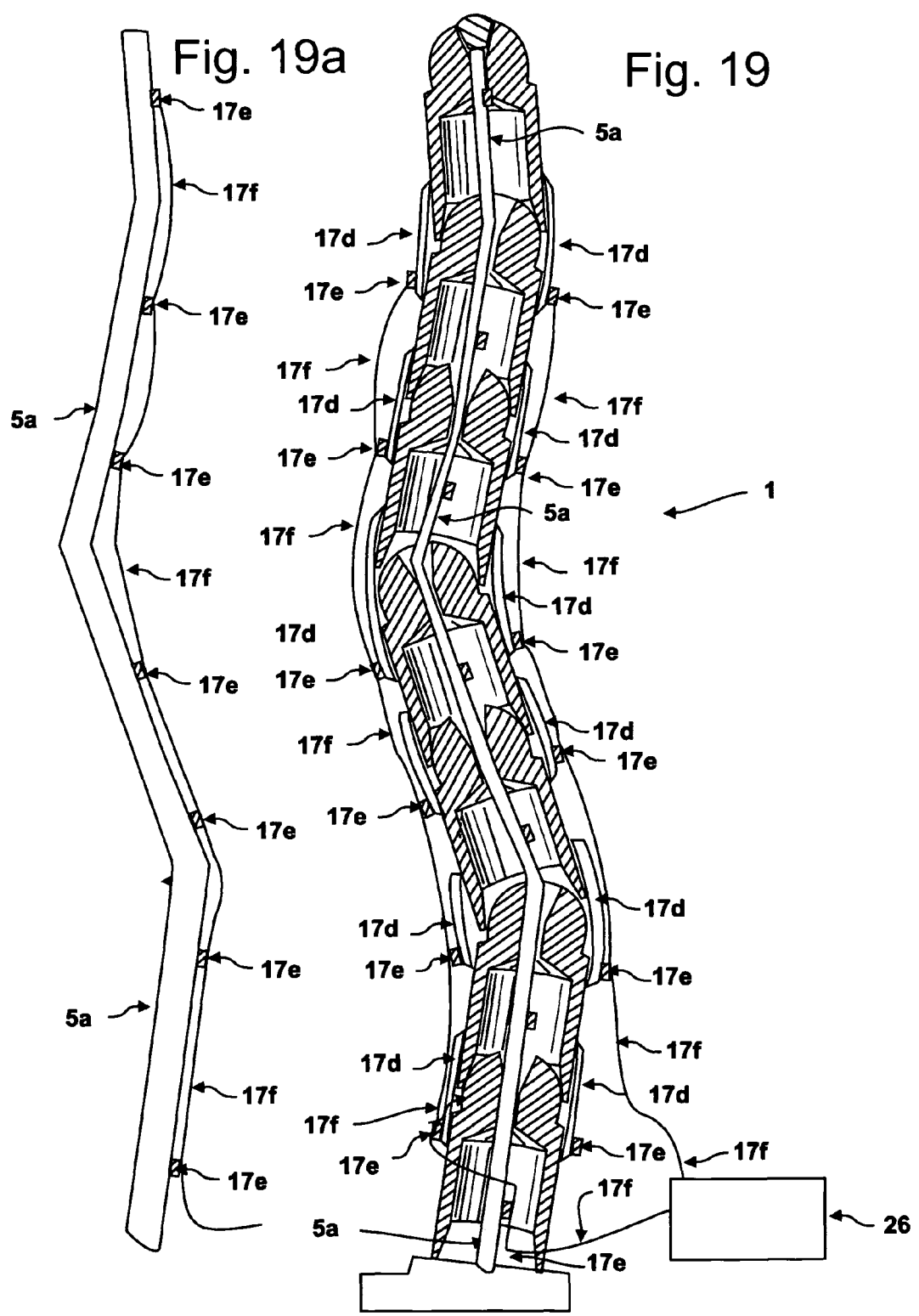

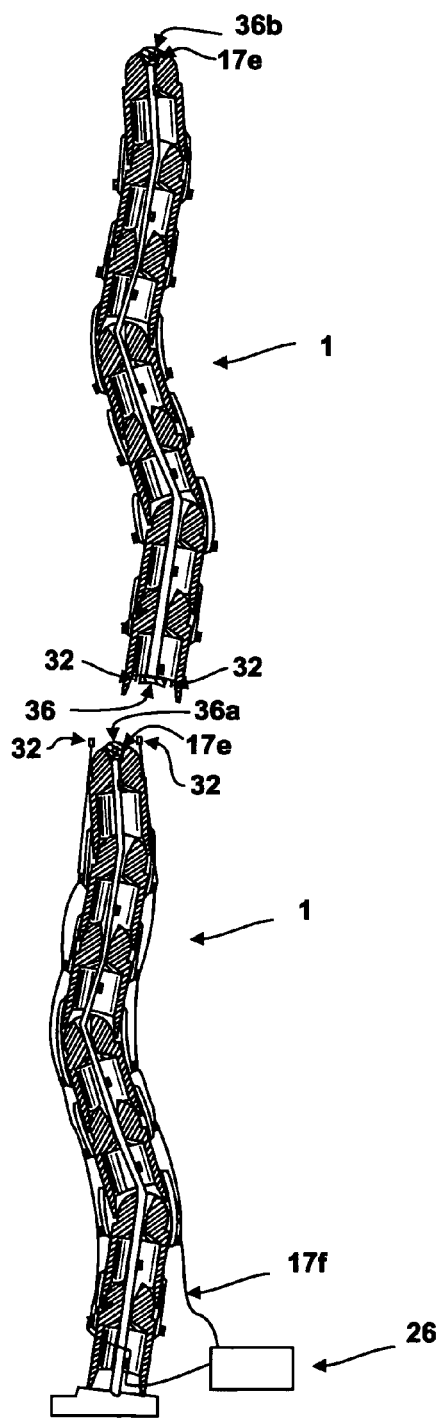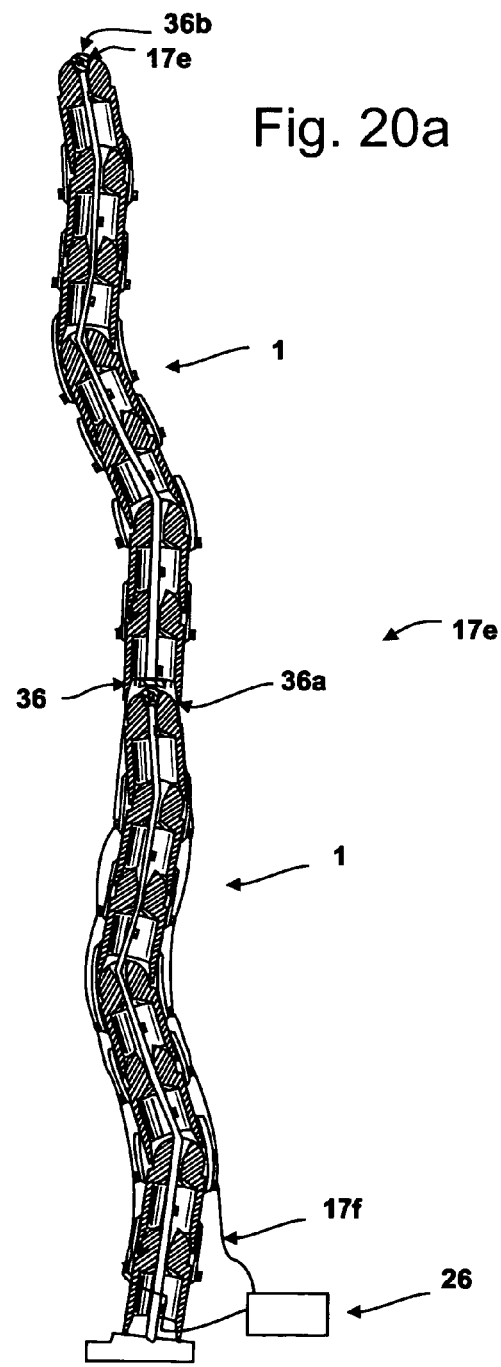

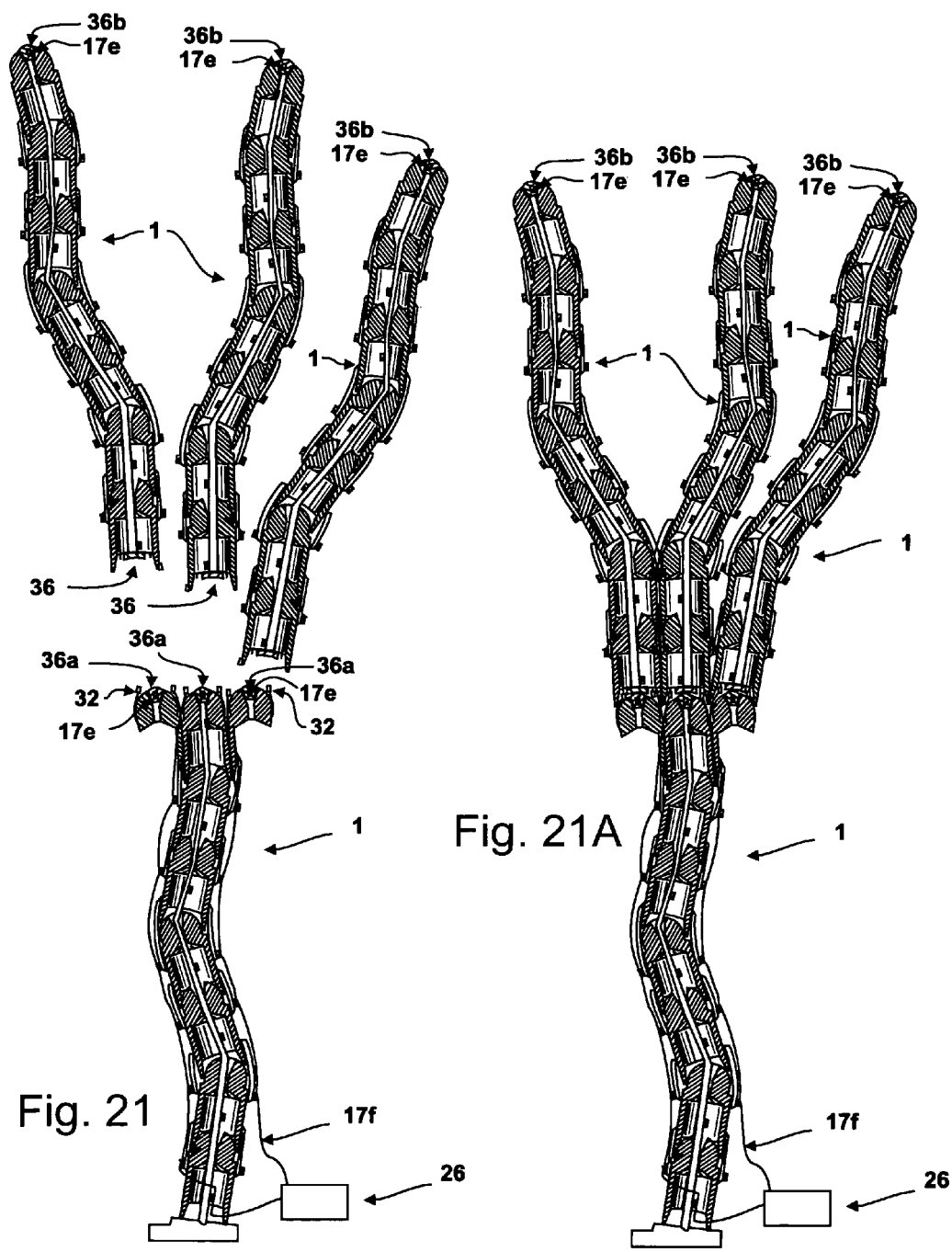

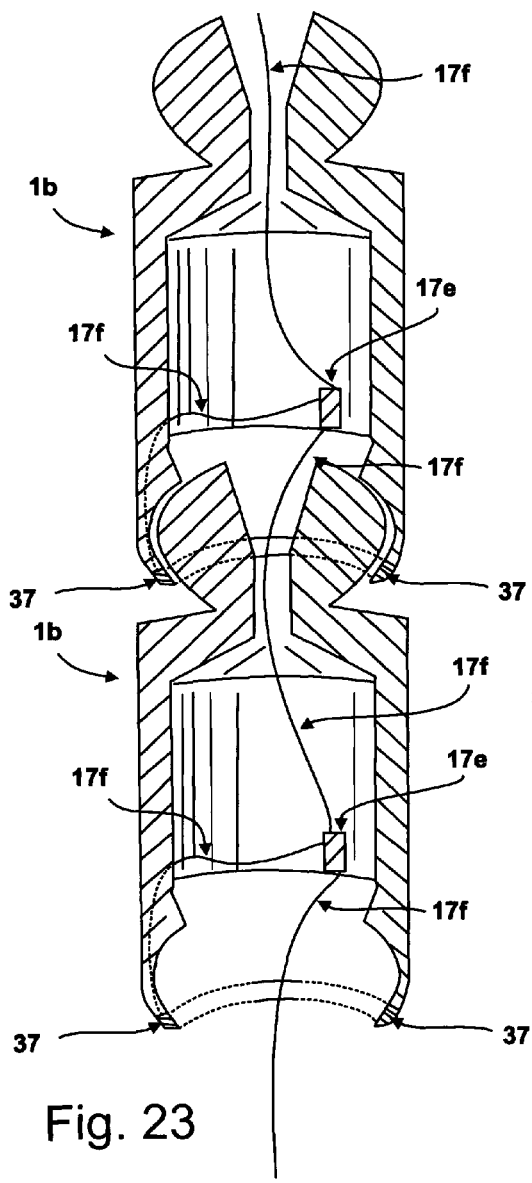
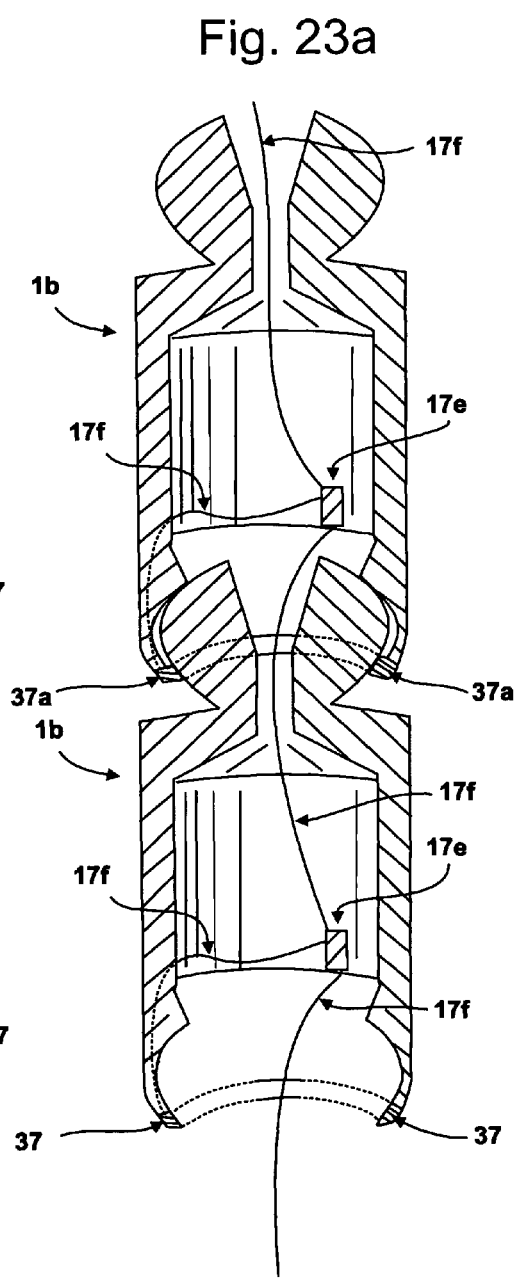
Fig. 23
Fig. 23a

SNAKING ROBOTIC ARM WITH MOVABLE SHAPERS

BACKGROUND OF THE INVENTION

1. Field of the Invention

This invention relates to a method and means for building an improved robotic arm and fingers that are snake-like, and which is composed of an articulable column, composed of segmented members that while flexible are shaped by shaping elements through which the articulable column passes and discrete microelectronic mechanical systems (MEMS) that shape the column. Once the snaking columns have reached the work site, all or parts of them are transformed into a rigid work platform by compressing various parts of the segmented members by means of compressing members, while still maintaining its shape.

2. Description of Prior Art

Articulable columns have long been known for use in positioning micrometers and other measurement tools, or as electric light stands.

U.S. Pat. No. 599,543 discloses a support for incandescent electric lamps where the column is composed of a series of ball/socket members. An extension spring through the column provides tension to lock the column in place. Electrical wires run inside this spring from the base to the lamp fixture.

U.S. Pat. No. 870,429 discloses a sectional stand where a steel cable is used to maintain tension on the ball/socket members. Also a mechanism is provided to increase or decrease tension on the cable.

U.S. Pat. No. 912,308 discloses a sectional stand using alternating bend axis ball/socket members and a detachable means of removing the lamp fixture. Also disclosed is a spirally wound steel cable which forms the tensioned flexible cable. Electrical wires run inside this cable.

U.S. Pat. No. 936,379 discloses an adjustable lamp bracket in which the articulable column is composed of alternating ball and socket members.

U.S. Pat. No. 1,279,803 discloses a light support where a mechanism is provided to readily change tension on an extension spring to increase or decrease stiffness of the column.

U.S. Pat. No. 2,510,198 discloses the use of a flexible positioner as a tool holder. A means is provided to adjust the cable tension. A protective, flexible covering over the column is also shown.

U.S. Pat. No. 3,096,962 discloses a locking device for a measuring apparatus or the like where a single cam mechanism locks both the articulable column and the tool in place.

U.S. Pat. No. 3,529,797 discloses a supporting stand for instruments, primarily surgical instruments, in which the stand can be readily disassembled, sterilized, and reassembled. A wedge mechanism tensions the articulable column cable.

U.S. Pat. No. 3,584,822 discloses a flexible column where the column can be locked or unlocked with a lever at the free end. Electrical wires run alongside a steel compressing member inside the column. Means are provided to prevent the column from being twisted.

The disadvantage to prior art columns is that they are not adapted to accommodate the forces acting on the column. Consequently they tend to sag when extended out horizontally to the floor and they are difficult to adjust into new positions.

When an articulable column is held or positioned horizontally to the floor, a large bending moment exists at the base joint of the column from which the full weight of the column and its tool is cantilevered. At the free end, column joints see only a small bending moment due to the free end weight multiplied by a short moment arm. Prior art columns (e.g. U.S. Pat. Nos. 599,543, 936,379, 2,510,198, 3,096,962, 3,168,274, and 3,584,822) built with a stack of identical ball and socket members are not adapted to these varying forces. Because each joint is identical, the stiffness of each joint is the same and therefore under load these columns tend to sag at the base joint where the force is greatest. Adjustment of these columns by gripping the column at the free end is also difficult because, if partially locked, the column remains stiff at the free end while persistently bending at the weakest base joint, or if tension in the column is completely released, the column collapses.

Prior art columns in which the diameter of the ball/socket members is greater at the base than at the free end (e.g. U.S. Pat. Nos. 870,429, 912,308, and 1,279,803) acknowledge the varying forces acting in the column. However, for long columns it is an unwieldy and inelegant method and difficult to manufacture.

U.S. Pat. No. 6,860,668 discloses an articulable column design that varies the angle of the socket surface that interfaces with the socket element, thereby controlling the modulus of the column at that point, for a given amount of tension. The difficulty with this design is that the surfaces of many of the socket joints must be machined to different specifications.

SUMMARY OF THE INVENTION

It is an object of this invention to provide an improved articulable column construction that overcomes the difficulties of column sag and adjustment.

It is also an object of this invention to provide a method and device that controls the shape of the articulable member, thereby providing a tool platform which can be directed down a tortuous passage, and return, without injury to the device or the body in which it is placed.

To accomplish this it is an object of this invention to provide a method for making the articulable column sufficiently stiff by introducing a springing member to the centre of the column in place of or in addition to the cable, which conventional articulable columns rely on. This springing member/compressing member $5a$ may have, but need not have, a variable modulus from one end to the other, for example, high modulus on the proximal end and lower modulus on the distal end, resulting in a column that will have stiff proximal or base joints where acting forces are large and (2) are relatively flexible at joints near the distal or free end where acting forces are smaller. This allows columns to be built which are slender, articulable, structural members which can support large free end loads, and/or long column lengths. Columns built with this method also can be articulated in a natural, effective fashion. It also allows the articulable column to be relatively flexible, prior to complete compression, which allows it to be shaped, yet, remain relatively straight in those sections that are not shaped. The springing member/compressing member $5a$ also gives the articulable column, and robotic arm, a biased shape, usually straight, so that the column returns to the biased shape once it has passed through the shaper. In some preferred embodiments the springing member/compressing member $5a$ is responsible for all or virtually all of the biased shape, while in other preferred embodiments, the biased shape is supplemented by the contribution of other components of the arm, such as the communicating tubes 181, 182. In other embodiments of the invention these said other components are designed to act as the sole springing element in which event a compression cable, referred to as a compressing member 5 will be required. The springing member/compressing member 5a may be made of any materials and designs, well known to the art. For example, it might be made of stainless steel or superlastic nickel-titanium and be solid or tubular, or of any suitable cross-section, or be a coiled spring. In some preferred embodiments, the compressing member 5 may also be used exclusively or in combination with cables or other members to put the segments of the articulable column into compression, thereby making it more rigid. In other preferred embodiments, the springing member/compressing member 5a is used solely to provide a springing support to the articulable column, leaving the compression of the segments comprising the said column to other members, such as compressing member 5b, which in some preferred embodiments are contained within the lumen of the springing element. It should be noted that since the springing member/compressing member 5a may also act as a compressing member, it is sometimes referred to as a compressing member.

There are many situations in which a robotic arm should move not like an arm with joints, but like a snake that can glide around obstructions on its way into the operation site, whether as part of a surgical procedure, or in an automobile factory assembling difficult to access parts. There are also situations in which the arm must curl around an obstruction with a relatively small radius. In the course of gaining entry to the site and in retreating from it, the arm need only be sufficiently stiff to maintain direction and position, as it enters the body. Only when it is at the operating site need it be stiff enough to allow the distal end of the arm to exert sufficient force to carry out the desired procedure. During entry and exit from the body the arm should actually be somewhat compliant to prevent injury to the body it courses through.

One difficulty with previous attempts to create a snake-like robotic arm is the fact that as the arm advances any curve must cascade, proximally or down the arm, and when exiting those curves must cascade distally or up the arm. This normally requires that each segment be separately controlled with cables and actuators, controlled by a computer, resulting in a vast number of cables for the various degrees of freedom at each segment. The problem multiplies as the number of turns increases, especially when they are in different axes.

Another difficulty with previous attempts to create a snake-like member is that the actuators that change the shape of the member do not have sufficient strength to hold it rigid, one the member is in position, and a stable work platform is required.

The present invention includes a selected number of shapers which can be moved up and down the articulable column and rotated around it. As the arm advances or exits the body, the shapers are given a suitable shape and location on the column to avoid the obstruction, and then set in that position, relative to the body, allowing the relatively flexible articulable column and outer skin to assume the shape of the shaper continuously as they advance and exit, over and/or within the shapers. As they exit the shaper, they return to their biased shape (usually straight) and advance until the next shaper is deployed, which in turn guides them through the next curvaceous turn. Thus, the arm self-computes the cascade of movements. The arm then operates in two modes, the first, a low energy mode in which the arm flexes easily, and responds to the shaper's directional changes; second, when the site is reached, a high energy mode, when the segments of the column are put into compression, creating a rigid member of the required shape, that can stably support the tools at the distal end of the arm and exert the necessary force to execute the work.

The present invention also includes means for controlling individual segments 1b of an articulable column 1, where finer control is necessary, such as the distal tip, or fingers of a robotic arm.

In those preferred embodiments of the invention that include shapers, any number of shapers may be included in the arm. Since the shapers are sized to pass through each other, the largest shaper will generally deployed first, the next largest shaper will pass through the first, and then be deployed; and each succeeding smaller shaper will pass through those already deployed, and be deployed, until all necessary shapers have been deployed. The shapers will be deployed in a shape that avoids any obstruction, and then stop, relative to the body in which it is inserted, allowing the articulable column, and skin, to pass through it to the next obstruction and to assume the shape of the shaper, allowing it to also avoid the obstruction. As each succeeding obstruction is encountered, another shaper is moved forward, shaped, stopped with respect to the body and shape the articulable arm and its skin, as it moves forward through the shapers. On retreating from the work site, the articulable arm will pass back through each shaper, and each shaper will then assume its pre-deployment shape, and retreat with the distal end of the articulable column.

Any and all of the shapers may change their shape, and their location relative to the articulable arm and the body, even after first deployment, as the operating situation may require. This may require coordination with the slackening of the tension of the compressing member 5, which then allows the articulable column 1 to flex and comply with the shapes newly created by the shaping elements.

The shapers may be constructed of various materials and incorporate electro-mechanical devices well known to the art, all being within the ambit of the invention. These methods of control may be remote from the shapers or integral to them. For example, the shapers may be composed of shape memory materials, including shape memory alloys, such as nickel-titanium, and shape memory polymers and electro-active polymers. These materials can change shape in response to heat which may be delivered to the shaper by means well know to the art, including by means of optical fibers or locally by electrical means, such as resistive heating. Other materials change shape in response to changes in electric current or charge. Microelectronic mechanical systems (MEMS) made of these materials or others may be used to create shapers that change the shape in response to electrical or photonic inputs. All these methods of creating shapers are within the ambit of the invention and the exemplar shapers herein described are only meant to instruct those familiar with the art to produce snake-like robotic arms and members that incorporate movable and fixed shaping means, within the ambit of the invention.

In some preferred embodiments the snake-like robotic arm is directed by an operator that has various visual aids to assist in directing the robotic arm into and out of the body. This may include one or more cameras located on the arm and other visual aids, well know to the art. In addition, certain routines may be programmed into the computer, which usually is part of the system, so that the arm will assume certain pre-programmed shapes as it advances into the body and while the procedure is ongoing. The system may also use the instructions on advancing the arm into the body, operator and computer generated, and use these instructions to effect the efficient withdrawal of the arm from the body.

The system may also incorporates various tactile feedback devices, which are usually incorporated into the various drive motors and actuators and then fed back into the computer controlled operator interfaces, including hand controls, to give feedback on the forces acting on the distal end of the arm and the attached operating tools. These are effected by means well known to the art.

The means herein disclosed of moving the shapers up and down the articulable column and rotating them about it, are also meant to be exemplary, are well known to the art and are all within the ambit of the invention. For example, instead of utilizing communicating tubes such as those herein described 181, 182, the shapers themselves might contain small motors and actuators, with perhaps gears that would engage cogs on the sheath 20 of the articulable column. Likewise the rotary motion of the shapes around the articulable column may be effected by similar means such as gears driven by remote cables that engage splines incorporated into the surface of the sheath 20 of the articulable column 1 or the skin 19. The shapers and tubes in other preferred embodiments may not rotate to position the shaper, but rely instead on multiple controlling elements 17, and cable casing 17b that are distributed around the circumference of the retainers 15, 15a, each controlled by a separate electro-mechanical motor 30 or MEMS device. In one preferred embodiment of the invention, the shapers have three controlling elements 17, and complementary cable casing 17b, equally spaced around the circumference of the spring retainers 15, 15a. By drawing or releasing each of the controlling elements 17, the spring 14 can be made to assume any curve and direction of curve desired, without requiring the tube 181, 182 to rotate.

Other preferred embodiments shape the articulable column directly by connecting abutting segments, or group of segments with MEMS devices that contract and expand and/or bend in response to energy inputs, for example electro-active polymers that change their shape in response to electrical inputs. These directly controlled segments may be used in conjunction with shapers, as described above, or alone. In one preferred embodiment the shapers and directly controlled segments are used together; the shapers to control the gross shape of the arm and the directly controlled segments for fine finger-like manipulations. However these two approaches both utilize an articulating column, which allows for low energy shaping and then while in the compressed mode, provides a rigid member. The compressing member 5 and compressing member 5a, as illustrated on FIG. 16, can be attached to different segments allowing for part of the articulable column to be compressed and made rigid, by putting the compressing member into tension, while the remaining part may remain flexible, to allow for shaping, before, it too is compressed and made rigid.

While the articulable column 1 is described in this disclosure as being comprised of ball and socket segments, it is to be understood that any column design that is capable of being transformed from a relatively flexible member to a relatively rigid member would be an embodiment of this invention and within its ambit.

In one aspect the invention provides a controllable robotic arm. The robotic arm comprises an articulable column; at least one compression element; at least one shaping element; a compression control mechanism and a shape control mechanism.

The articulable column is comprised of a plurality of segments connected together end-to-end and a plurality of joints between said segments. Each each segment defines a longitudinal axis and has a first end and a second end spaced apart from one another along said axis. Each joint is located between a first end of one segment and the second end of an adjacent segment, and is movable so as to permit variation in the axial alignment of an adjacent pair of segments.

The articulable column is transformable from a low energy state in which said joints are freely movable so as to produce bending in said column, and a high energy state in which at least one of said joints is compressed so as to constrain its movement and thereby increase rigidity in the column along at least part of its length.

The at least one compression element acts on said articulable column so as to produce compression in at least one of said joints and thereby transform said articulable column from said low energy state to said high energy state.

Each of the shaping elements extends along at least a portion of the articulable column and, when in position for actuation, extends along at least one of said joints. Each of the shaping elements is flexible and bends when actuated so as to produce bending movement of said joint.

The compression control mechanism controls rigidity of said articulable column, wherein said compression control mechanism selectively actuates one or more of said compression elements so as to reversibly and controllably produce compression in at least one of said joints.

The shape control mechanism controls the shape of said articulable column, and selectively actuates one or more of said shaping elements so as to reversibly and controllably produce movement in at least one of said joints.

In another aspect of the invention, each of the segments comprises a ball at its first end and a socket at its second end, the sockets of the segments having a diameter sufficient to receive the balls of the segments.

In yet another aspect of the invention, the balls and sockets have a hyperbolic shape.

In yet another aspect of the invention, the segments are annular and are each provided with a central, axially extending aperture, the apertures of the segments aligning to form a central passage extending between a proximal end and a distal end of the articulable column. The compression element comprises an elongate tensioning element extending through said central passage and having a first end located at the proximal end of the articulable column and a second end fixed to one of the segments spaced from the proximal end of the articulable column. The first end of the tensioning element is attached to said compression control mechanism, and the compression control mechanism controls the tension in the tensioning element.

In yet another aspect of the invention, the tensioning element is a cable and the compression control mechanism includes means for increasing tension in the cable.

In yet another aspect of the invention, the tensioning element is comprised of a shape memory alloy and is shorter in its heated, austenitic state than in its cooler, martensitic state, or vice versa, and the compression control mechanism includes means for heating the tensioning element to a temperature at which at least a portion of the shape memory alloy is transformed to austenite.

In yet another aspect of the invention, at least two of said tensioning elements are provided; a first one having a hollow interior and a second one extends through the hollow interior of the first tensioning element, wherein the second tensioning element comprises a cable and has a length which is equal to or greater than a length of the first tensioning element.

In yet another aspect of the invention, the first tensioning element has a variable modulus so as to be more flexible at its distal end.

In yet another aspect of the invention, a plurality of said shaping elements are provided, each extending along an outer surface of the articulable column.

In yet another aspect of the invention, a plurality of the shaping elements are comprised of hollow springs, each mounted between a pair of annular retaining plates, wherein one of the retaining plates is mounted to an end of a cylindrical communicating tube, and wherein the articulable column extends through said shaping elements.

In yet another aspect of the invention, the retaining plates of each shaping element are connected together by cables at one or more points around their circumference, at least one of the cables being controlled by said compression control mechanism so as to produce an off-centre compression or expansion force in said spring and thereby cause bending of said shaping element.

In yet another aspect of the invention, the shaping elements are slidable axially relative to the segments of the articulable column, and are also rotatable about an axis of rotation which is parallel to the longitudinal axis of at least one of the segments.

In yet another aspect of the invention, an inner diameter of the shaping elements is varied such that the shaping elements are nestable with one another, such that the coil spring of a first shaping element is received inside the cylindrical communicating tube of a second shaping element, and wherein bending of the spring of the first element causes bending of the tube of the second shaping element.

In yet another aspect of the invention, the hollow spring is a coil spring or an expandable mesh spring.

In yet another aspect of the invention, a plurality of said shaping elements are comprised of microelectronic mechanical devices (MEMS) and the shape control mechanism comprises a plurality of addressable controllers attached to or embedded in said MEMS devices, a computer which controls actuation of said MEMS devices, and one or more conduits or a signal bus through which the MEMS devices are connected to said computer.

In yet another aspect of the invention, each of the shaping elements comprises an element which is variable in shape and/or length and which extends across at least one of said joints of the articulable column.

In yet another aspect of the invention, each of the shaping elements is comprised of a material selected from electroactive polymers and shape memory alloys and either partly or completely surrounds said at least one joint.

In yet another aspect of the invention, a proximal end of the robotic arm is connected to a telescoping member received within an articulating ball actuator.

In yet another aspect of the invention, a distal end of the robotic arm is provided with a connector for attaching a tool.

In yet another aspect of the invention, the robotic arm comprises two or more of said articulable columns joined end to end, wherein an electromagnetic connector is provided between the joined ends of the columns and is actuated during joining of the columns.

In yet another aspect of the invention, a locking mechanism is provided for releasably locking two adjacent segments together. The locking mechanism comprises an annular collar formed on an inner wall of the socket of a first segment, and one or more addressable controllers for resistively heating the annular collar. The collar may be comprised of a shape memory alloy which recovers a memorized shape when it undergoes a phase transformation between a first state and a second state; wherein the collar defines an inner diameter at the open end of the socket, and the collar has a diameter in said first state which is smaller than a diameter of the collar in said second state. Resistive heating of the collar by the addressable controllers causes the shape memory alloy of the collar to transform from one of said states to the other of said states.

In yet another aspect of the invention, the first state is an austenitic state and the second state is a martensitic state; wherein heating of the collar to the austenitic state causes the collar to constrict and engage the outer surface of the ball of a second, adjacent segment.

In yet another aspect of the invention, the first state is a martensitic state and the second state is an austenitic state; and wherein heating of the collar to the austenitic state causes the collar to expand.

In yet another aspect of the invention, the locking mechanism further comprises an annular groove formed in a base portion of the ball of the second segment; wherein the diameter of the collar in the martensitic state is greater than a maximum diameter of the ball; and wherein the diameter of the collar in the austenitic state is less than a diameter of a base portion of the ball, such that the collar, when heated to its austenitic state, becomes locked in the groove of the ball.

In yet another aspect of the invention, each of the segments of the articulable column is provided with said locking mechanism, such that the locking mechanisms comprise the compression elements of the robotic arm, wherein the diameter of the collar in the martensitic state is less than a maximum diameter of the ball and greater than a diameter of the base portion of the ball; such that heating of the collar to its austenitic state causes the ball to be drawn into the socket, thereby compressing the joint between the ball and the socket.

BRIEF DESCRIPTION OF THE DRAWINGS

FIG. 1 is a sectional view of three example segments 1b in a column 1, which is known to the art. Each segment is comprised of one ball 2 and one receiving socket 3. Compressing member 5 passes through a center aperture in the assembly, and puts the column into compression, when the operator wishes to stiffen the column.

FIG. 2 is a sectional view of a column 1a, known to the art, which have joints in which are comprised of separate balls 2a and sockets 3a, which have two oppositely opposed sockets.

FIG. 3 is a sectional view of a means known to the art for putting the compressing member 5 into tension, so as to compress the segments 2a and 3a of the column 1a.

FIG. 4 is a cross-sectional perspective view of a springing element/compressing member 5a which may be springy and may have a variable modulus from the proximal end to the distal end. The compressing member 5a may be tubular and have a compressing member 5b inside its lumen, and/or 5a may also be a compressing member.

FIG. 5 is a cross-sectional perspective view of ball 2b and receiving socket 3b which are not spherical, but are hyperbolic, with the result that when put into compression they have a preference for assuming a straight line.

FIG. 6 is a cross-sectional perspective view of articulable column 1 that is placed through a gauntlet of obstructions 13.

FIG. 6a is a cross-sectional perspective view of a shaper.

FIG. 6b is a cross-sectional perspective view of three shapers end-to-end, that illustrate how they might shape the articulable column illustrated in FIG. 6.

FIGS. 7 and 7a are cross-sectional perspective views of one possible type of shaping element, in which a spring 14, which is uncompressed in FIG. 7a, is compressed along one part of the circumference of the spring, by tensioning controlling element 17, causing the spring 14a to bend in the desired shape as illustrated in FIG. 7a.

FIGS. 8 and 8a are cross-sectional perspective view of one possible type of shaping element, in which a spring 14, which is normally compressed evenly around the circumference of the spring, is released along only a part of that circumference, by easing the tension on controlling element 17, causing the spring 14a to bend in the desired shape as illustrated in FIG. 8a.

FIG. 11 and FIG. 11a are cross-sectional perspective views of two shaping elements, similar to those illustrated in FIGS. 7 and 7a, which include communicating tubes 181 and 182, and which are nested together to form a two shaping tube column. As illustrated the said tubes 181 and 182 can be rotated and moved longitudinally, with respect to each other, and with respect to any other member within or outside the said tubes.

FIG. 16 illustrates two separate compressing members 5 and 5a: 5 which controls the entire articulable column 1, and 5a which controls only the proximal portion. FIG. 16 also illustrates MEMS devices 17d which control abutting segments 1b of the articulating column 1. The MEMS devices 17d and associated addressable controllers are daisy-chained to minimize the number of conduits 17f.

FIG. 18 also illustrates how addressable controllers 17e allow for multiple MEMS devices 17d and feedback devices 33 operating from a single bus.

FIG. 19 is a cross-sectional perspective view of an articulating column that is externally shaped by electro-polymer MEMS devices 17d in its low energy flexible state and is transformed to its high energy rigid state along selected parts by shortening the length of selected parts of the springing element/compressing member 5a.

FIGS. 20 and 20a are cross-sectional perspective views of articulating columns 1 docking using a combination of electromagnets 36a, controlled by addressable controllers 17e and fixed magnets 36.

FIGS. 21 and 21a are cross-sectional perspective views of articulating column 1 docking using a combination of electromagnets 36a, controlled by addressable controllers 17e and fixed magnets 36 to form a three finger hand.

FIG. 23 and FIG. 23a are cross-sectional perspective views of two connected and interlocking segments 1b. FIG. 23 illustrates the two segments 1b when the SMA annular collar 37 is in its austenitic phase and hence the annular collar is relatively large, allowing the ball segment 1b to tilt freely within the socket portion of its mate. FIG. 23a illustrates the two segments 1b when the SMA annular collar 37b has been heated, transforming it into its austenitic phase and recovering its memorized shape, which has a relatively smaller annular opening, which locks the ball and socket mates together.

DESCRIPTION OF THE PREFERRED EMBODIMENTS

Figure 9:
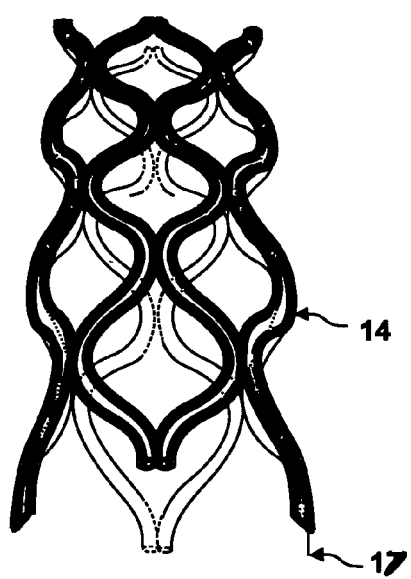
FIGS. 9 and 9a are perspective views of one possible type of shaping element, in which a spring 14 is webbed or in expanded metal form, which is uncompressed in FIG. 9, is compressed along one part of the circumference of the spring, causing it to bend in the desired shape as illustrated in FIG. 9a. This preferred embodiment, the controlling element 17 is threaded through the tubular member(s) wholly or partly making up the web.

FIGS. 1, 2 and 3 illustrate the existing art. FIG. 1 illustrates a typical articulable column 1, which is comprised of segments 1b, each having a ball 2 on one end and a socket 3 or receiver on the other. The movement of each segment is limited by a shoulder 7. Each segment 1b also has a lumen 4 through which a flexible cable, the compressing member 5 passes. One end of the cable or compressing member 5 is connected to the most distal segment by connecting means, such as a swage 6, and at the proximal end by a spring 9a, and turnbuckle comprised of a threaded spring retaining block 10a threaded stud 10, thumbscrew 11 and bearing 12; all contained within a retaining tube 9. The cable or compressing member 5 is generally tightened somewhat, providing sufficient friction, with the cooperation of the spring 9a, to arrange the articulable column, herein referred to as the "initial friction". Once in place the cable is further tightened so that it becomes rigid. FIG. 2 illustrates another type of articulable column which is comprised of separate balls 2a and receivers 3a, the latter having two opposed sockets, end to end.

As illustrated in FIG. 4, in one of the preferred embodiments of the invention, the articulable column 1 includes a springing element/compressing member 5a which occupies the lumen of the segments 1b of the column 1, but may be larger and have the articulable column 1 within its lumen. This springing element/compressing member 5a maintains the articulable column in a predetermined shape, usually straight, prior to the cable or compressing member 5 being put under tension, thereby compressing the column segments 1b. This springing element/compressing member 5a may also serve in place of the compressing member 5 or supplement its function of compressing the column segments 1b. If this is so, the springing element/compressing member 5a is usually connected to the most distal column segment and the other end of 5a to the tensioning control means. In other preferred embodiments of the invention the cable or compressing element 5b is retained, usually in the lumen of the springing element/compressing element 5a.

In some preferred embodiments the springing element/compressing member 5a has a variable modulus to compensate for the greater moment of force exerted at the proximal end than at the distal end, by forces acting on the distal end of the column 1. This is usually accomplished by simply having a tapering cross-section in the springing element/compressing member 5a, with the greater cross-section at the proximal end and less at the distal. Other methods, well known to the art, can also be utilized for this purpose, such as heat treating and sectioning connected members, each having a different modulus. FIG. 4 illustrates a springing member/compressing element 5a which has a lumen and has a tapered cross-section to accomplish this purpose.

The springing element/compressing member 5a also serves to give the articulable column a starting shape, usually straight, which can then be modified by the shapers. As mentioned, this springing element may be a separate element or may be incorporated into other components of the arm 22.

FIG. 5 illustrates a special purpose ball and socket combination in which the interfaces between the ball 2b and socket 3b are not spherical, but parabolic. This causes this connection, on compression to lock into the predetermined orientation, defined by the angle of the parabolic curve to the longitudinal axis of the segments. This type of connection provides a very rigid coupling, which in some preferred embodiments are used at various parts of the articulating column, in place of the spherical type, or other types well known to the art. This type of coupling is used in some preferred embodiments on the proximal and distal end of the arm 22.

FIG. 6 illustrates how an articulating column 1 may snake its way through obstructions 13 with the addition of shapers as illustrated in FIGS. 6a and 6b. These shapers are in most preferred embodiments placed on the outside of the articulating column, although they may also be located within the lumen 4 of the segments 1b.

Figure 12:
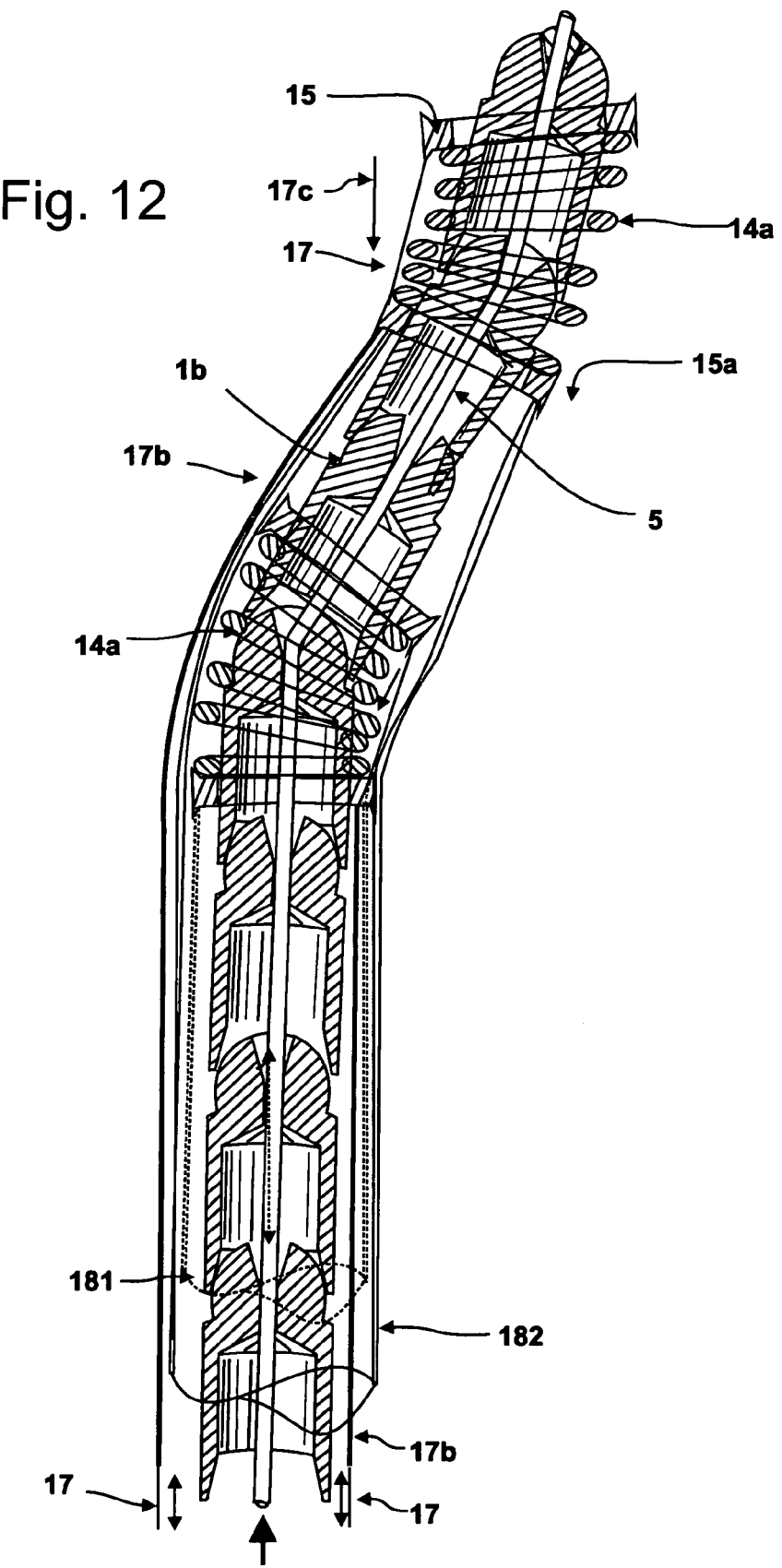
FIG. 12 is a cross-sectional perspective view of a two nested shaping elements, including communicating tubes 181 and 182 which have inserted into their lumens, an articulable column 1, which assumes, while in its relatively compliant phase, the shape imparted to it by the said two nested shaping elements.

FIG. 6a illustrates an example of a shaper being comprised of a spring 14 attached at its ends to annular retainers 15 and 15a. The shaper changes its shape in response to a off-centre compressing force provided by the cable 17 drawing spring retainers 15 and 15a together at one point on their circumference, against the opposing force of the cable casing 17b, which is connected to the proximal spring retainer 15a. The shaper also includes a communicating tube 181 which is connected to the proximal spring retainer 15a. As this tube is rotated and relocated vertically 18a, the placement of the curvature of the spring 14 is likewise relocated. If a shaper is placed over the articulable column, as illustrated in FIG. 12, the shape of the shaper imparts its shape onto the said articulable column 1. By this method the shaper can impart virtually any curve on the articulating column, in virtually any orientation. In some preferred embodiments the cable 17 is enclosed in a separate lumen in the communicating tube 181, in which case the said lumen can act as a cable casing 17b or a separate cable casing 17b may be used. Flanges 16 may be used on the spring retainers 15 and 15a to better communicate their orientation to the member in which they slide.

The communicating tube 181 of the shaper needs to be flexible to allow it to snake through obstacles, but yet have sufficient stiffness to turn the shapers and serve as a stable platform for the spring retainer 5a. Fortunately, when the articulable column is not fully stressed and flexible, it is in a low energy mode which permits the use of low energy springs 14 and relatively flexible communication tubes 181, 182. These tubes 181, 182 may be made of any suitable material such as plastic or superlastic nickel-titanium and may be webbed or ribbed to make them more flexible in bending, yet relatively robust in turning and pushing and pulling. The design of the web or rib pattern to accomplish these ends is well known to the art.

FIG. 6b suggests how a series of shapers (partly rendered for diagrammatical clarity) can provide a shaping scaffold for the articulable column 1, and if such a scaffold were held fixed, a flexible articulable column passing through its lumen would assume the same shape, and avoid the obstructions 13.

FIG. 7 and FIG. 7a illustrate how the shaper illustrated in FIG. 6a is transformed from its original shape (FIG. 7) to its curved shape (FIG. 7a), by simply drawing the cable 17, altering the spring shape from 14 in FIG. 7 to a curved shape 14a as illustrated in FIG. 7a.

Depending upon how much the cable is drawn, the radius of the curve can be determined with precision.

Figure 13:
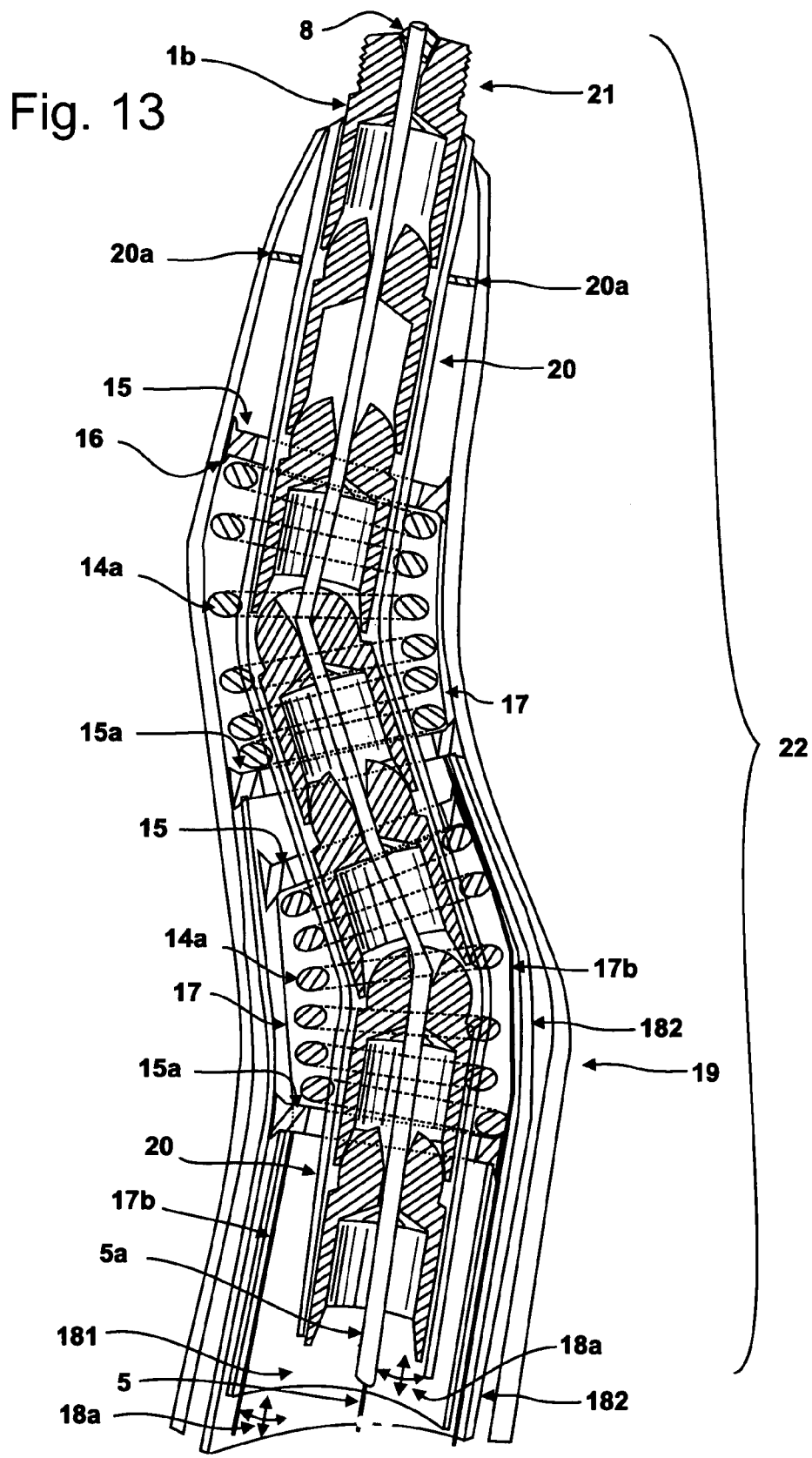
FIG. 13 is a cross-sectional perspective view of and example of a preferred embodiment comprising two nested shaping elements, similar to that illustrated in FIG. 12, but with the addition of a covering element or membrane 19 and a flexible sheath 20 that enwraps the articulable column 1 and provides a smooth and slippery surface for the shaping elements and communicating tubes 181 an 182 to smoothly rotate around the said column and to slide up and down the said column.

FIG. 8 and FIG. 8a illustrate a shaper that starts as a compressed spring, the cable 17 and stay 17c retaining the spring in this position. The spring then may have its shape altered by allowing the cable 17 to slacken a desired amount, causing the spring to expand 14a, as illustrated in FIG. 8b, on the side that the cable 17 is attached to the spring retainer 15. The advantage of this arrangement is that the shapers are more compact and may be loaded into the distal end of the arm 22 prior to the arm being deployed into the body. As the proximal shaper will normally be deployed first, on entering the body, the shapers distal to it will limit the radius of turn of the distal end of the arm 22, until those shapers are in turn deployed. Of course the shaper springs 14 illustrated in FIGS. 6a and 6b may be symmetrically compressed, by the communicating tube being pressed up sufficiently, so that the spring retainer 15 encounters a stop 20a in the arm, as illustrated in FIG. 13, or the spring retainer 15 encounters a more distal shaper that remains stationary. Either of these methods may be adopted to compact the shapers during the procedure.

Figure 9A:
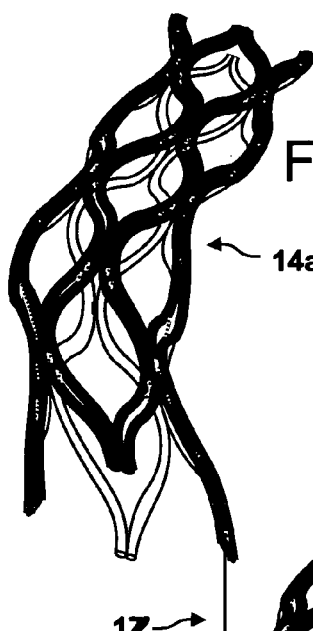

As mentioned above the shapers may take many forms, and FIGS. 9 and 9a illustrate a shaper spring of the web or expanded metal type. This type of spring can be used in place of the springs illustrated in shapers illustrated in FIGS. 6a and 7. If the web type spring is made of hollow tubes, the cable 17 may be threaded up one or more of the struts and attached either to the distal end of the spring, or a spring retainer 15. The spring 14 can then be of any spring or shape variable device design known to the art, which is suitable for the purposes of the invention, including accordion type springs and shape memory devices.

Figure 10:
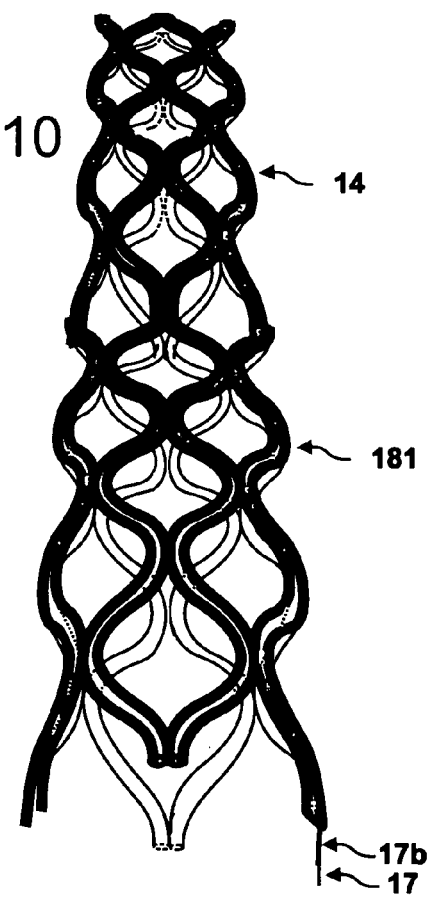
FIG. 10 and FIG. 10a are perspective views of one possible type of shaping element, in which only a portion of the springing element, which is webbed or in expanded metal form, is bent by tensioning the controlling element 17, as illustrated in FIGS. 9 and 9a, and the remainder of the springing element serves as the communicating tube 181. Like that preferred embodiment illustrated in FIGS. 9 and 9a, the controlling element 17 can be threaded through the tubular member(s) wholly or partly making up the web.
Figure 10A:
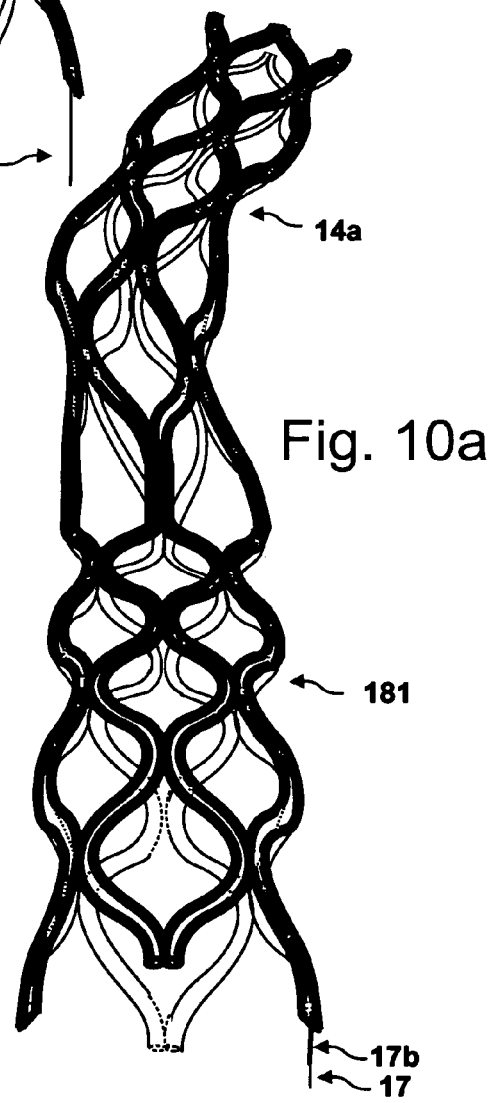

FIGS. 10 and 10a illustrate how a web type spring 14 may be a part of the communicating tube 181, simplifying the design of the shaping element. The cable casing 17b can be used, or can be threaded through a lumen in the web. The web or expanded metal comprising the spring 14 and communicating tube 181 can have a varying pattern that is well known to the art and allows for the tube section 181 to resist compressing and torquing, but allow bending, while the distal spring 14 section will allow both compression and bending.

FIGS. 11 and 11a illustrate how two shaper elements, as illustrated in FIG. 6a, can be nested together, with the proximal communicating tube 181 being smaller in diameter than the distal communicating tube 182. Likewise any number of shaping elements may be nested together. FIGS. 11 and 11a also illustrates how each of the shapers may be rotated and relocated distally and proximally 18a independently. While the preferred embodiment of the invention illustrates communicating tubes 181 and 182, it should be understood that other communication means, well known to the art may be used and be within the ambit of the invention, such as cable, rod and/or gear arrangements or actuators incorporated into the spring retainer 5a, to name a few.

FIG. 12 illustrates how the shapers impart their shape onto the flexible articulable column 1. While the shapers are located on the outside of the flexible articulable column, other preferred embodiments of the invention place the shapers inside the lumen 4 of the segments of the said column.

FIG. 13 illustrates a preferred embodiment of the snake-like robotic arm 22, comprised of an articulable column 1, enclosed in a close fitting flexible sheath 20 that is slippery and smoothes out the joints of the column segments 1b. This sheath may be made of any suitable flexible material such as plastic tubing.

In this preferred embodiment, a springing element 7, which is made of superlastic nickel-titanium, is utilized as both a springing element and a compressing member to compress the abutting surfaces of the segments 1b of the articulable column 1. The said springing element 7 is from its proximal end to its distal end to provide a variable modulus that assists in maintaining the flexible articulable column 1 in a predetermined shape, usually straight, prior to deployment.

The robotic arm 22 also includes a skin 19 which can be removed and replaced with a sterilized new skin, for those procedures requiring a sterile instrument. A means for attaching instruments to the distal end of the 21 may be fitted to the distal segment of the articulable column 1.

The cables for the instruments that are connected to the distal end of the said column may pass through the lumen of the said articulable column 1 or inside the lumen of the skin 21, or some other convenient passage. The robotic arm 22 includes two shaping elements, but could contain any number required. Prior to deployment of the arm 22, the shaping elements, illustrated in FIG. 6a, are moved to the distal end of the arm. As the arm is inserted in the body, generally the most proximal shaper will be deployed and vary its shape, and the shape of the arm, in a direction that the operator chooses, so as to avoid an obstruction. The arm 22 will then advance, through and over the said shaper, which will remain stationary, with respect to the body. When the next obstruction is encountered, the next most distal shaper will then be deployed and shaped, and the arm will move over and through the said two shapers, which shall both remain stationary with respect to the body. If there are more shapers, and they are required, each in its turn will be deployed and shaped. When the procedure is complete, the arm will be removed in reverse sequence.

As mentioned above, the shapers may be composed of many different mechanical and/or electro-mechanical mechanisms, all well known to the art. These mechanisms may include micro-electronic mechanical systems (MEMS) which are incorporated into the shapers themselves and cause those elements to bend in response to electronic or photonic inputs, such as shape memory tubes, micro-actuators and electro-active polymers and other electro-active materials.

Figure 14:
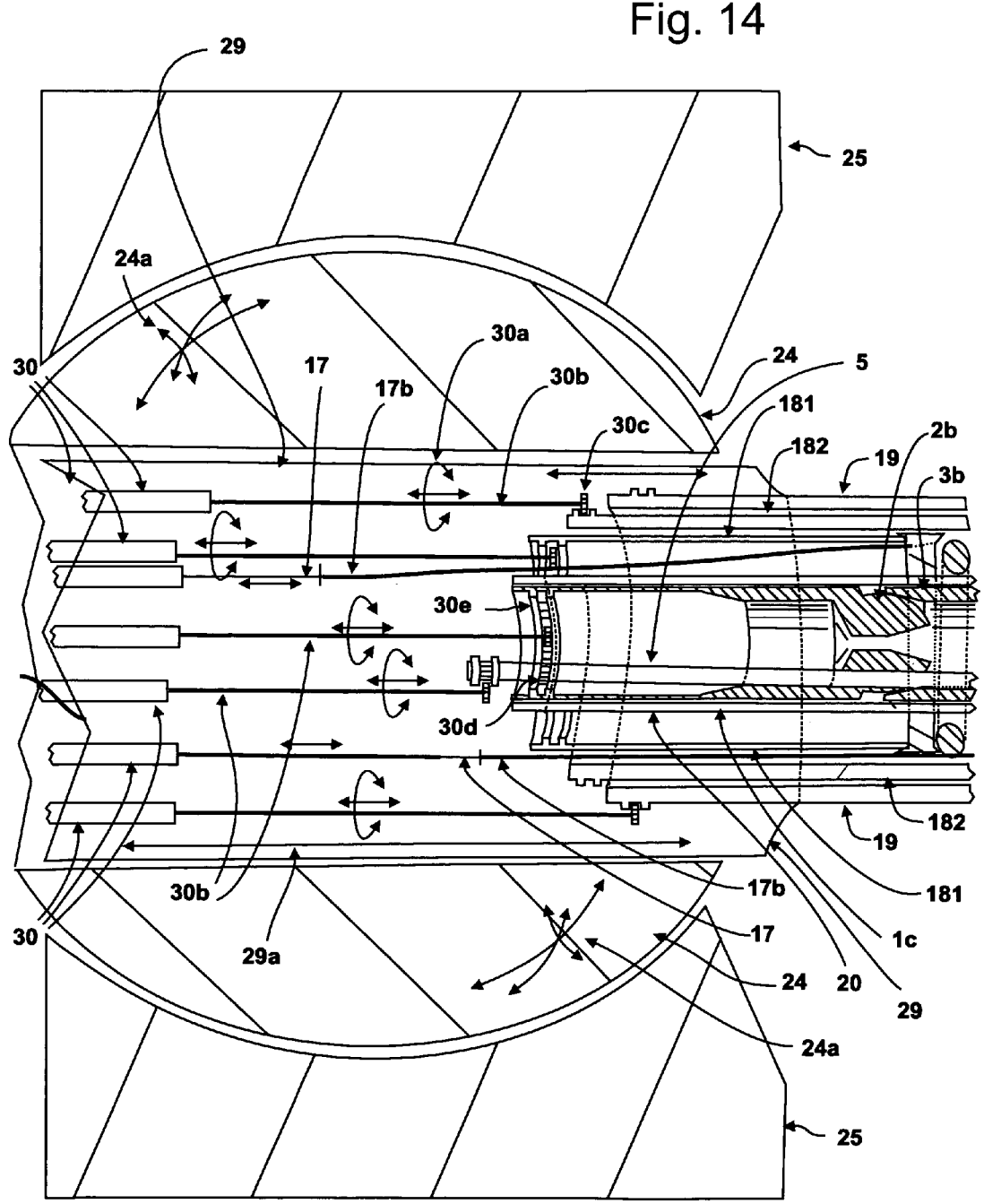
FIG. 14 is a cross-sectional perspective view of the articulating interface 24, 29 and control unit 25 which controls the gross movement of the arm, the position of the shaping elements and the tension on the member within the articulable column that controls the arms stiffness. Provision for tactile feedback to the operator may be incorporated into the electromechanical transducers/motors 30 that effect the movements of the various arm components, or by other means well known to the art.

FIG. 14 schematically illustrates an example of the control and articulating interface between the robotic arm and the operator's command inputs. There are many methods of controlling the motion and shape of the shapers, as well as the tension of the articulable column and the movement of all the components of the system.

In the preferred embodiment of the invention illustrated in FIG. 14, the joint between proximal segments 2b and 3b may be of the hyperbolic type which ensures proper alignment between the articulable column 1 and the control interface 24 and 25. When the articulable column is compressed, even slightly, the joint will become straight and maintain the proper alignment.

In the example of FIG. 14, the proximal end of the arm is connected to a telescoping member 29, its motion 29a controlled by actuators, not shown, that allow it to move back and forth, within an articulating ball articulator 24, that in turn can rotate in virtually all directions 24a, together providing gross motion for the arm 22. The articulating ball articulator 24 moves within a complementary housing 25 with a complementary spherical cavity, by actuators not shown, for diagrammatical clarity. The motions of the various components may be provided by actuators 30 that provide rotational and/or linear motion 30a. In FIG. 14 these take the form of servo motors that drive gears 30c by connecting members 30b, which gears travel in ring gears 30d in slots 30e. The rotational motion of the actuator outputs turn the gears which in turn rotate the components, such as the shapers. The linear motion, proximally and distally up and down the arm, is provided by these same or other actuators. In the example illustrated in FIG. 14, the sides of the gears engage the slots 30e, communicating the linear thrust of the actuator into linear motion of the component of which the slots 30e are a part. FIG. 14 does not include the controllers for the tools at the distal end of the robotic arm 22, and these are well known to the art, and may be integrated into the interface illustrated. Also the connections and supports for the various components have not been illustrated for diagrammatical clarity. Some embodiments of the invention may include a spring like 9a on FIG. 3, between the actuator 30 and the drive gear 30c for the compressing member 5, 5a to absorb shocks and maintain the desired tension.

Figure 15:
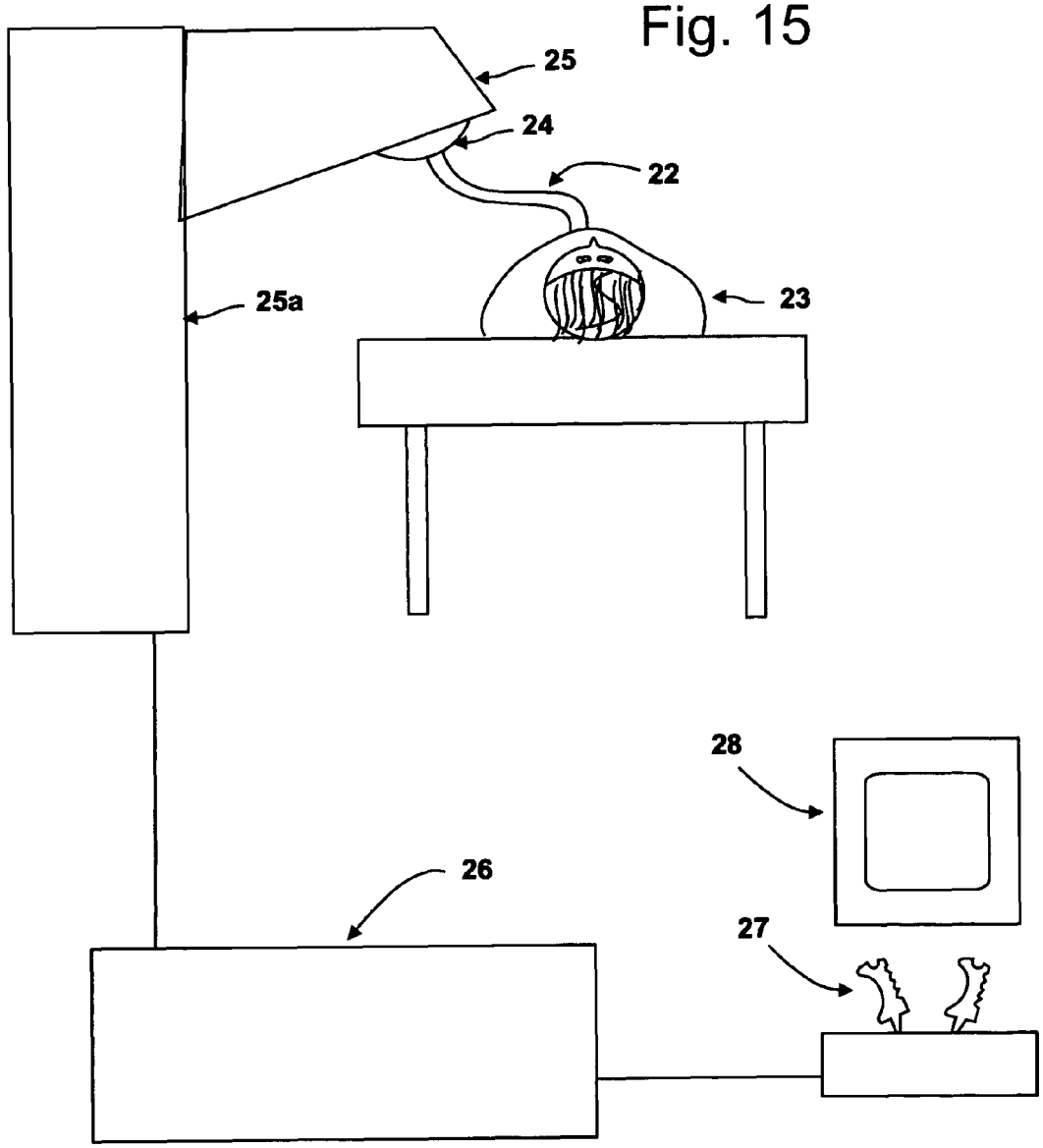
FIG. 15 is a perspective block diagram illustrating the typical layout of an operating station that incorporated the snake-like robotic arm 22 with articulating interface 24, 29 between the said arm and the control unit 25, which in turn contains the actuators and tactile feedback sensors. The said station also includes a computer to control the actuators and feedback mechanisms 26 and a workstation with hand controls 27 and visualization means 28.

FIG. 15 illustrates one possible use for the snake-like robotic arm, as a surgical device. The robotic arm 22 and control interface 24, 25 illustrated in FIG. 14 are part of the control system 24a, which is attached to or includes a computer 26, and work station 27, 28. The robotic control system includes components well known to the art, including hand controllers 27 and visual aids 28, which would include video screens, x-ray imagers etc. Sensory feedback to the hand controllers would allow the operator to sense the forces acting on the robotic arm and various tools that are employed. These for the most part are provided by sensors that detect the current draw and load at the actuators.

It is to be understood that the snake-like robotic arm may be used for many purposes and is not limited to surgery. Wherever access to a work site is tortuous, the snake arm can be used.

Figure 16:
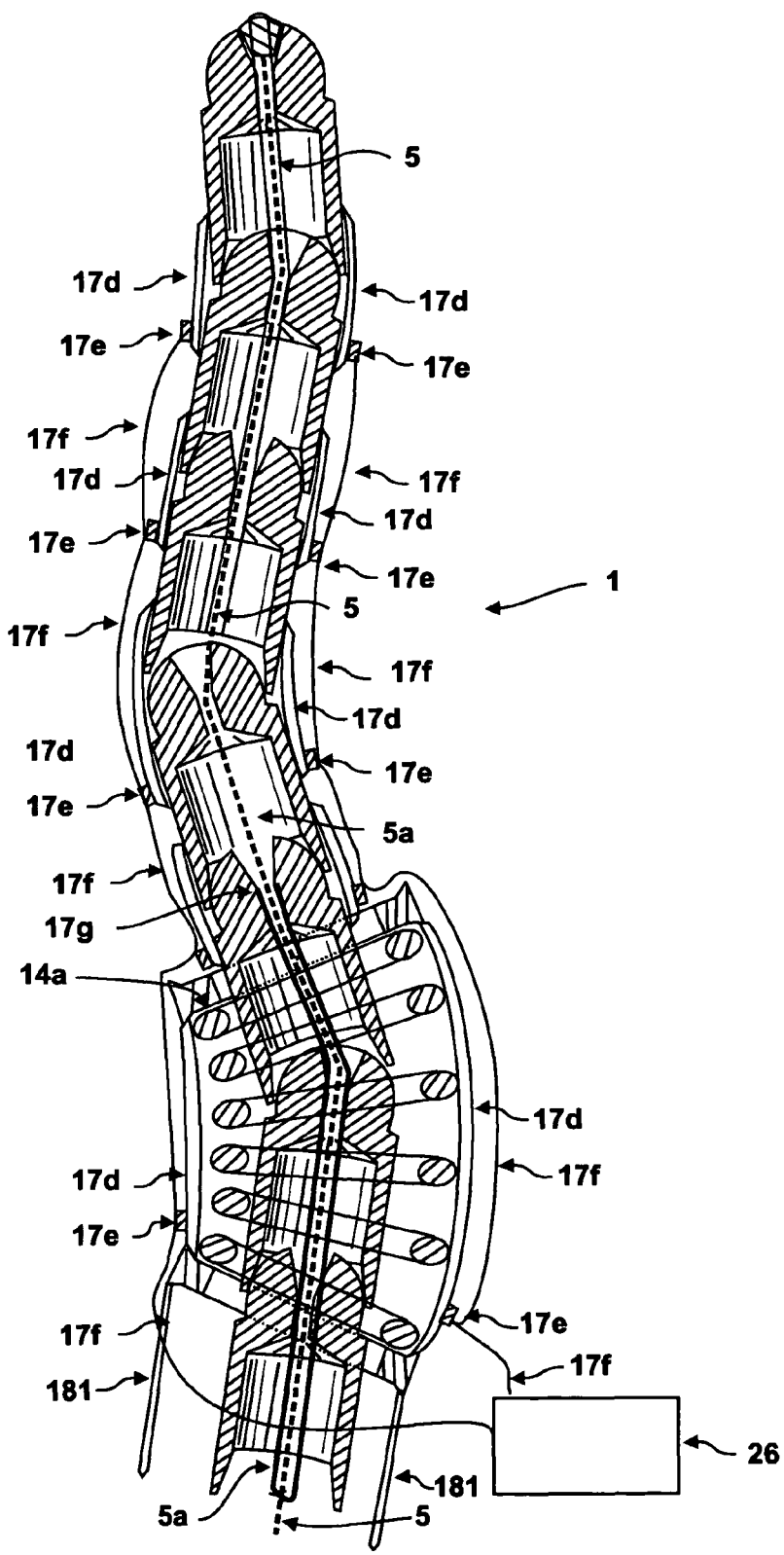
FIG. 16 is a cross-sectional perspective view of an articulating column 1 that as one shaper spring 14a partly curved and tube 181 forming the shaper. The spring 14a is shaped by a MEMS device 17d that changes shape in response to energy inputs delivered by conduits 17f to embedded addressable controllers 17e.
Figure 18:
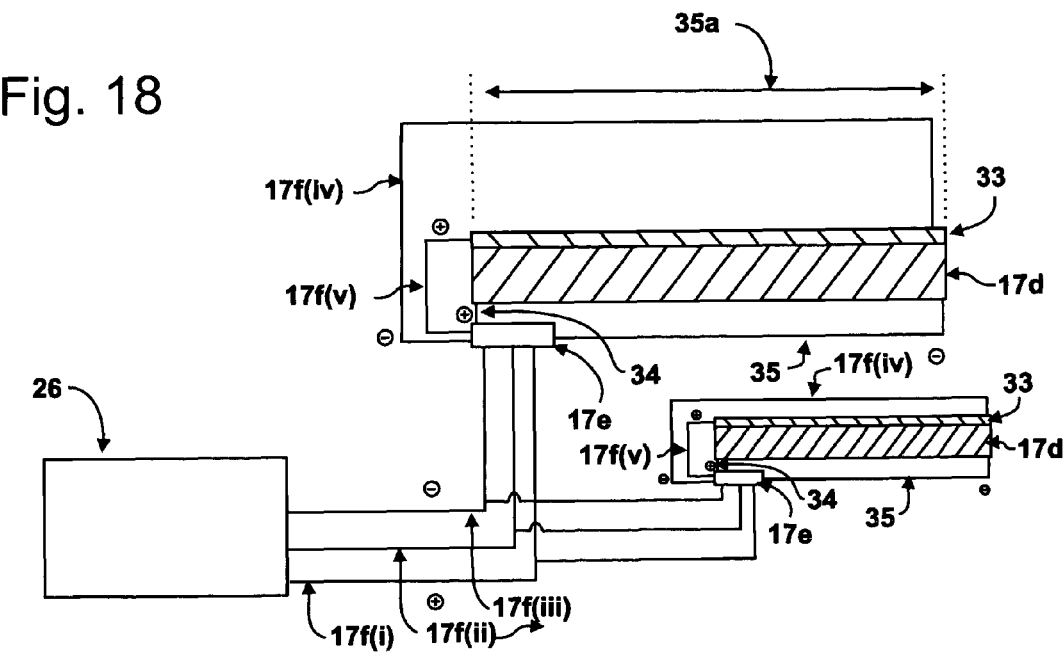
FIG. 18 is a block schematic of an example control system including a computer 26, bus or conduit 17f, MEMS device 17d, addressable controller 17e and output feedback layer 33.
Figure 18A:
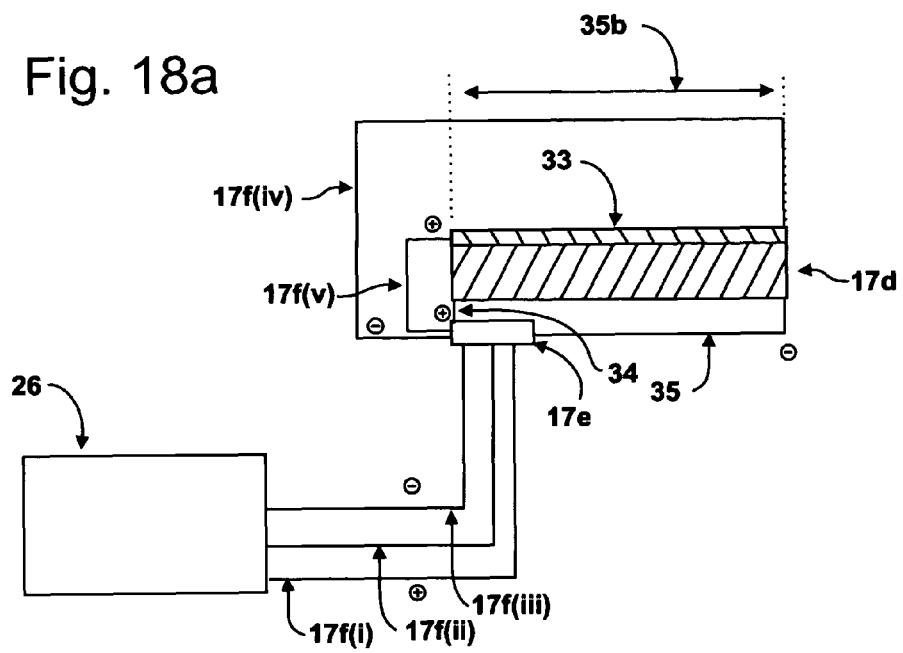
FIG. 18a is a block schematic of an example control system showing the MEMS device 17d and feedback layer 33 contracting in response to electrical current applied by the addressable controller 17e.

FIG. 16 is a cross-sectional perspective view of an articulating column 1 that has one shaper spring 14a partly curved and tube 181 forming the shaper. The spring 14a is shaped by a MEMS device 17d that changes shape in response to energy inputs delivered by conduits or a bus 17f to embedded controllers 17e, each having its own address, hereinafter referred to as addressable controllers 17e. For diagrammatical clarity, FIG. 16 illustrates one wire connecting a computer 26 to all of the addressable controllers 17e, but it should be noted that the wire, conduit or bus is actually comprised of a number of wires, as illustrated in FIGS. 18 and 18a and described in more detail below. The advantage of using addressable controllers, daisy-chained together, is that only a small number of connecting wires is required. It should however be understood that separate wires for the delivery of power and control signals may be used for some preferred embodiments. These conduits 17f may be in the form of tracks along which the embedded controllers slide, while maintaining electrical contact, permitting them to move relative to the articulable column, using methods well known to the art; or they may have fixed connections. It should also be noted that some preferred embodiments may not have embedded controllers 17e, but have separate powered control wires for each MEMS device, and relying on integrated control by the computer 26.

FIGS. 18 and 18a illustrate in more detail an example of connections of one embodiment of the invention. The MEMS device 17d, in this example comprises at least one electro-active polymeric element extending across a joint between a pair of segments. The sleeve contracts when a current is applied to it from length illustrated as 35a in FIG. 18 to length 35b in FIG. 18a. In this example, the addressable controller 17e has three connections 17f(i), 17f(ii) and 17f(iii) running from the computer 26 to the addressable controller 17e. These three connections form a signal bus and power to drive the MEMS device 17d and to receive feedback signals from a output feedback length or strain detector 33 through 17f(v), with ground 17f(vi). This strain detector can be a simple strain gauge embedded or attached to the MEMS device 17d and the signal is addressed by the addressable controller 17e. Such length or strain detectors are well known to the art and any convenient type may be used and be within the ambit of the invention. FIG. 18 also illustrates how multiple MEMS devices 17d and feedback devices 33 can be connected to the same bus 17f comprised of: 17f(i), 17f(ii) and 17f(iii).

The MEMS devices 17d in some preferred embodiments are composed of electro-active polymers and/or other materials such as shape memory alloy (SMA) that change their shape in response to the delivery of energy to them. Other MEMS devices are electro-mechanical and are made from a combination of motors and mechanical linkages and transmissions.

FIG. 16 illustrates how a MEMS device in the form of a plurality of electro-active polymeric elements can impart a shape of the articulating column indirectly using a movable shaper comprised of tube 181 and compressed spring 14a. Some preferred embodiments do not have springs at all, but rely on the MEMS device(s) to impart a desired shape onto the articulable column. FIG. 16 also illustrates how these MEMS devices in the form of electro-active polymeric elements can impart shape by acting directly on abutting segments 1b of column 1. Some MEMS devices 17d shorten or lengthen in response to an electrical impulse, acting in a similar way to the curving of the spring 14a; others bend, and thereby impart a curved shape to the adjoining segments of the articulable column; still others may do both. If addressable controllers 17e are used to control the power that is delivered to each separate MEMS device 17d, and the feedback strain gauge 33, and each device has a unique address, the computer 26 can control each MEMS device in a coordinated manner to cause the column 1 to adopt any desired shape and snake around obstructions as the articulable column is advanced or withdrawn around obstructions. A combination of both means of shaping (i.e. bending and changing length) the column may be used for some preferred embodiments, although others will contain one type. It should be noted that for the purpose of diagrammatical clarity only a few MEMS devices 17d and their associated controllers 17e and conduits 17f have been shown in FIGS. 16 and 17. Typically there would be at least three or four such devices located around each shaping spring 14a and around the segment 1b pairs, although for some preferred embodiments, any number may be used. Although the illustration 16 shows the MEMS devices 17d spanning a single joint between a pair of adjoining segments 1b, it should be appreciated any number of segments may be spanned.

Some of these MEMS devices, such as the electro-active polymers, have a thirty to forty percent strain, but exert relatively little force. The MEMS devices 17d are then used to shape the articulable column 1 in its low energy state, when flexible, and then the compressing member 5, 5a can compress the segments of the column 1, (the high energy state) to form a rigid column of the desired shape.

Some preferred embodiments have a combination of MEMS devices that exhibit large strain and low power with others that exhibit high power and low strain. For example, MEMS devices 17d that have high rates of strain, but exert low force, might connect segments that are separated by one or more intermediate segments. This MEMS device might be of the polymer type, referred to above. These MEMS devices would be responsible for imparting shape onto the articulable column 1. This arrangement would also include MEMS devices 17d which would have low strain rates, but exert high forces. These MEMS devices could connect adjoining segments 1b of the articulable arm 1 and be responsible for compressing and relieving the adjoining segments 1b of the articulable arm 1, making it more rigid and more flexible, respectively. These compressing MEMS devices would act in lieu of or in addition to the compressing members 5 and 5a. In some preferred embodiments the MEMS device 17d would be incorporated into the segments 1b themselves, in which case the energy that causes the MEMS devices to change shape would cause adjacent segments to lock together. For example, the ball 2 of one segment 1b could expand inside the socket 3 of an adjacent segment 1b, causing them to lock together, but any other convenient method may be adopted and be within the ambit of the invention. It should be noted that MEMS devices 17d that exhibit both sufficiently high rates of strain and high force potentials could be used for both purposes and be connected to any convenient segments 1b of the articulable column 1. This arrangement of shaping (the low energy state) and making the articulable arm rigid (the high energy state), allows any part of the arm to be placed in either of the two states. In these examples, the high energy state is created by the higher friction created between segments 1b which resists relative motion and the low energy state occurs when this friction is reduced.

FIG. 19 illustrates an articulable arm in which the low energy shape forming is produced by MEMS devices 17d, addressable controllers 17e, and conduits or bus 17f daisy-chained in a scheme similar to that illustrated in FIG. 18. The MEMS devices for this purpose in some preferred embodiments are of the large strain, low force type, such as electro-active polymeric elements. The springing element/compressing member 5a in some embodiments of the invention is a tube comprised of a high force, low strain material such as shape memory alloy (SMA) in which the addressable controllers 17e control the flow of electrical current to the SMA tube and the springing element/compressing member 5a thereby resistively heating all or part of the SMA tube. FIG. 19a illustrates such a springing element/compressing member 5a contained in the articulable column 1 illustrated in FIG. 19. The SMA tube when heated above the Austenitic finish temperature, exhibits shape recovery and assumes a shorter shape recovered Austenitic length, which compresses the articulable column 1, along that part of the tube that is heated. When the addressable controllers 17e stop the flow of current, the SMA cools by ambient cooling below its Martensitic finish temperature, reassuming its longer Martensitic shape, reducing the compression between the segments 1b and thereby causing the articulable column 1 to become flexible in those parts so cooled. Other preferred embodiments of the invention utilize other materials that shorten in length in response to current flow, without significant heating, for the springing element/compressing member 5a, but exhibit sufficiently high forces to compress and thereby stiffen the articulable column, these materials being well known to the art.

In other embodiments of the invention compressing members 5, 5a will be utilized. FIG. 16 also illustrates two separate compressing members 5 and 5a: 5 which controls the entire articulable column 1, and 5a which controls only the proximal portion. Some preferred embodiments will contain any number of compressing members attached to various portions of the articulating column 1, depending upon the use to which it is put.

In some preferred embodiments, as in FIG. 16, the springing element/compressing member 5a may take the form of a sheath for the other compressing member 5, which is a cable. These may be used in combination to put various portions of the articulable column into compression, thereby making it rigid, or by relaxing the compressive force, causing it to become more flexible. If the springing element/compressing member 5a in FIG. 16 is connected to an articulable column only at its distal end 17g, it could act to tension all those segments from the point of connection to the proximal end of the articulable column 1. This springing element/compressing member 5a could also act as a sheath for the second compressing member 5 and if the springing element/compressing member 5a was not put into tension, but into compression as compressing member 5 is put into tension, only that portion of the articulable column distal from connection point 17g would become rigid. Also, one can readily appreciate that in this embodiment, if both 5a and 5 are put into tension, thereby putting all the segments 1b of articulable column 1 into compression, the entire column would become rigid. It can then be appreciated that the points at which the compressing members are connected to the segments 1b could be made movable by using methods well known to the art, for example, a threaded connecting element turning in a threaded lumen, formed within the lumen of the articulable column. These threaded connecting elements could be located at the distal end of the compressing members 5 or 5a and by varying the point of connection; the desired portion of the articulable column could be compressed and made rigid.

Figure 17:
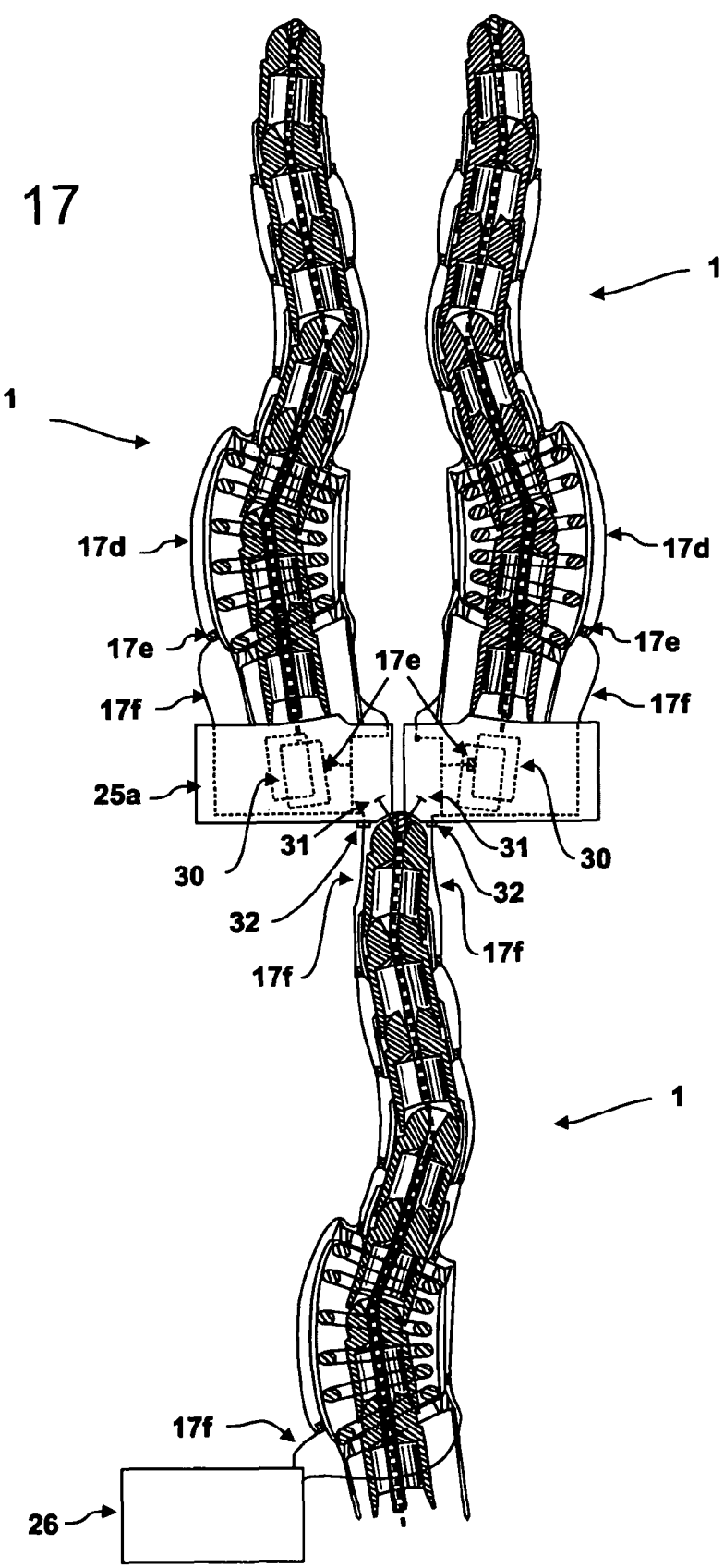
FIG. 17 is a cross-sectional perspective view of three modular articulating columns that are connected to form an arm and two finger, hand-like assembly.

While FIG. 16 illustrates a single articulable column 1, it should be noted that several such articulable columns, forming fingers, may be connected to a single articulable column 1, with snap connectors 31, forming an arm, as illustrated in FIG. 17. FIG. 17 illustrates two modular fingers, each with integrated control interface 25a, which may contain the actuators or motors 30 that control the tension imparted to the compressing members 5, 5a. In some preferred embodiments, the integrated control interface is dispensed with, for example, those that utilize MEMS 17d, to provide the compressive forces for compressing the arm segments 1b, in lieu of the compressing members and associated motors 30. In FIG. 16, the conduit 17f connects the embedded addressable controllers 17e and MEMS devices 17d with the computer 26. Any number of modular articulable columns 1 may then be arranged into any convenient conformation. As can be readily appreciated, the connecting points between the various modules may be made with snap on and off connectors 32, well known to the art, making remote assembly of the modules possible. For some uses, this assembly may take place in a body cavity when the access port does not allow the complete assembly to be inserted. It should be noted that the lower articulable column 1, referred to as the arm, illustrated in FIG. 17, is only illustrated in part, and will contain a control interface 24, 25 as illustrated in FIG. 14.

The fact that the columns can be separately made rigid, allows for the fingers to act in their low energy mode, in which they are flexible, grasping an object with a small force, imparted by the MEMS devices 17d, then made rigid, by compressing that portion of the articulable column, with the compressing members 5 or by other methods, described herein. Finally, a larger force applied by a more powerful shaper, or other motive device acting on the now rigid fingers can cause the fingers to squeeze the object with a greater force than would be possible with electro-active polymer MEMS devices 17d that are connected to the segment 1b pair. For example, in FIG. 16, the shaper with compressed coil 14a could include a shape memory alloy (SMA) MEMS device 17d that has low strain but that is able to exert significant force. This shaper could deflect the articulable column, while the distal part of the column has been made rigid, above connection 17g, by the compression of those segments 1b above connection 17g, by compressing element 5, as described above, while the proximal portion controlled by the low strain, but high force MEMS device 17d, remains relatively flexible.

Tools, for example, scalpels and forceps, can be added to the distal end of the articulable column 1, and the motion of these can be controlled by the motion of the arm and also by extension of the conduit 17f, and MEMS devices 17d and addressable controllers. Snap type connectors 31 and 32 can connect the said implements to the distal end of the articulable arm 1, and the conduit lines, respectively. These connectors may themselves be MEMS devices 17c, made for example of shape memory alloy (SMA) which clamp or swage the adjoining modules together, controlled by an addressable controller 17e and computers 26.

Figure 22:
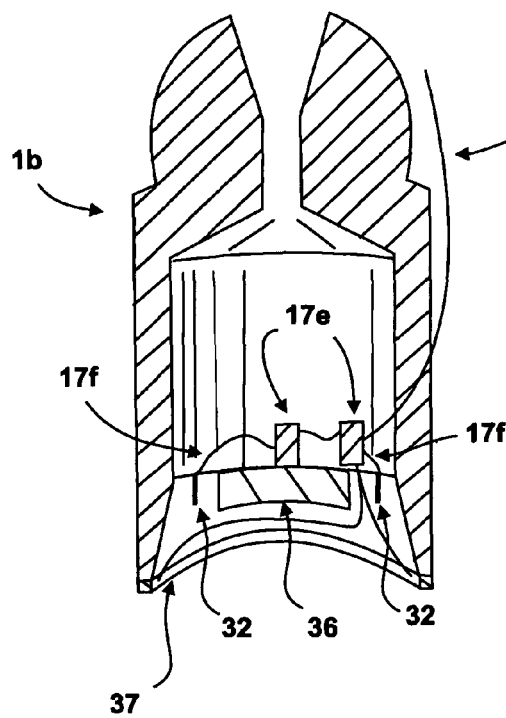
FIG. 22 is a cross-sectional perspective view of an articulable column segment 1a with a SMA annular collar 37, illustrated in its martensitic phase in which the annular opening is relatively large.
Figure 22A:
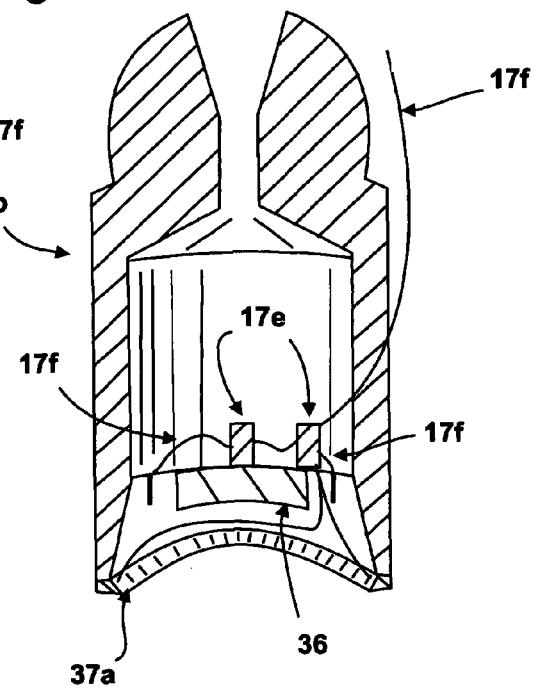
FIG. 22a is a cross-sectional perspective view of the same segment 1b as illustrated in FIG. 22, except that the SMA annular collar 37a has been heated, transforming it into its austenitic phase and recovering its memorized shape, which has a relatively smaller annular opening.

As illustrated in FIGS. 20 and 20a, in some implementations of the invention, each module may have an electromagnet 36a at one of the connecting ends, being a MEMS device 17d with addressable controller 17e, which would control its state and perhaps polarity, while at the other end a fixed magnet, exhibiting opposite polarity. Once energized the electro-magnet at the end of the first segment would attract another segment, the second segment, having a fixed magnet 36, exhibiting opposite charge. The geometry of the two ends are such that they lock together at a predetermined relative angle and orientation, which aligns and connects any electrical or photonic connections 32. Once connected, the electromagnetic end of the second segment 36b is activated and then connects with a third segment presenting its fixed magnetic end, and so on ad infinitum until all available segments are connected. This would allow the modules to self-assemble, as each end of the segments of opposite polarity, would attract one another, and prevent the locking together of more than one segment. While this example includes fixed magnets, electro-magnets that are activated by induction could be used as well by methods well known to the art, and these would be within the ambit of the invention. Obviously, those preferred embodiments that incorporate magnets, must not be made of materials that would be inadvertently attracted to the magnet 36 or 36b. Once locked together by magnetic force, additional connecting force could be effected by MEMS 17d type annular collars, incorporated into the ends of the modules. For example, FIG. 22 illustrates a SMA annular collar 37 that, when heated by resistive heating by energy supplied by an addressable controller 17e, recovers its memorized shape as it becomes austenitic, thereby reducing the diameter of annular opening 37a as illustrated in FIG. 22a. This reduced annular orifice indexes with a groove 37b of an adjacent segment 1b, as illustrated in FIG. 22b, locking the two segments 1b together.

Figure 22B:
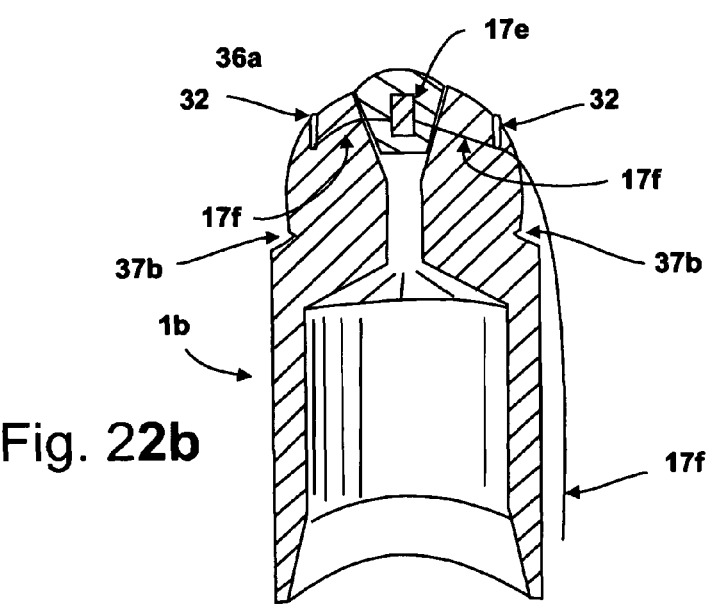
FIG. 22b is a cross-sectional perspective view of a segment 1b that connects with the segment 1b illustrated in FIGS. 22a and 22b. The reduced annular orifice 37b, as illustrated in FIG. 22b indexes with a groove 37b as illustrated in FIG. 22b, locking the two segments 1b together.

FIG. 23 and FIG. 23a illustrate two connected and interlocking segments 1b which interact similarly to those illustrated in FIGS. 22, 22a and 22b, except that they interlock and thereby obviate the necessity for a tensioning cable 5. FIG. 23 illustrates two segments 1b when the SMA annular collar 37 of a first segment 1b is in its austenitic phase and hence the annular collar is relatively large, allowing the ball of an adjacent segment 1b to tilt freely within the socket portion of its mate. FIG. 23a illustrates the two segments 1b when the SMA annular collar 37b has been heated, transforming it into its austenitic phase and recovering its memorized shape, which has a relatively smaller annular opening and locks the ball and socket mates together. It can be readily appreciated that embodiments of the invention that include these interlocking segments illustrated in FIGS. 23 and 23a permit the selective locking together of interfacing segments 1b with addressable controllers 17e. It should also be noted that this type of interlocking segment can be used in any of the preferred embodiments herein described. For example, groups of segments 1b as shown in FIGS. 23 and 23a may be shaped by shapers similarly to those illustrated in FIG. 12, MEMS devices 17d as illustrated in FIG. 16, or any other suitable shaper.

It should also be noted that some preferred embodiments have several SMA annular collars incorporated into or forming the ball and socket joints, rather than just one, as illustrated in FIGS. 23 and 23a.

Fabricated articulable columns 1 from these types of interlocking segments 1b is well known to the art. For example, the interlocking segments 1b may be pressed together while the annular collar is in the phase in which the annular opening is relatively large and the socket portion of the segment 1b is sufficiently elastic that it can be pressed over the socket portion of its mating segment 1b. The elastic socket portion then recovers to loosely envelope the ball portion of the mating segment 1b.

FIGS. 21 and 21a are similar to those articulable columns 1 illustrated in FIGS. 20 and 20a, except that three fingers port to each other to form a hand.

While the addressable controllers 17e described herein are connected to each other and to computer 26 by conduits 17f, it should be appreciated that wireless connections between the components could be used in whole or in part and be within the ambit of the invention.

While reference has been made to certain types of MEMS devices, it should be understood that this includes the whole class of smart materials and micro-machine devices that can act on the articulable arm to effect shapes, and all would be within the ambit of the invention.

Is to be understood that the examples of preferred embodiments of the invention described herein are comprised of various elements and that other preferred embodiments may contain various combinations of those elements and be within the ambit of this invention. For example, some drawings for diagrammatical clarity do not include covering skins or membranes and others do not include shapers.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the inventions and appended claims.

What is claimed is:

1. A controllable robotic arm, comprising:
(a) an articulable column comprised of:
  (i) a plurality of segments connected together end-to-end, wherein each segment defines a longitudinal axis and has a first end and a second end spaced apart from one another along said axis;
  (ii) a plurality of joints between said segments, wherein each joint is located between a first end of one segment and the second end of an adjacent segment, and wherein each joint is movable so as to permit variation in the axial alignment of an adjacent pair of segments;
  wherein said articulable column is transformable from a low energy state in which said joints are freely movable so as to produce bending in said column, and a high energy state in which at least one of said joints is compressed so as to constrain its movement and thereby increase rigidity in the column along at least part of its length;
(b) at least one compression element which acts on said articulable column so as to produce compression in at least one of said joints and thereby transform said articulable column from said low energy state to said high energy state;
(c) at least one shaping element, each of which extends along at least a portion of the articulable column and, when in position for actuation, extends along at least one of said joints; wherein each of said shaping elements is flexible and bends when actuated so as to produce bending movement of said joint, wherein said shaping element is operatively configured to slide axially relative to said segments of said articulable column;
(d) a compression control mechanism for controlling rigidity of said articulable column, wherein said compression control mechanism selectively actuates one or more of said compression elements so as to reversibly and controllably produce compression in at least one of said joints; and
(e) a shape control mechanism for controlling shape of said articulable column, wherein said shape control mechanism selectively actuates one or more of said shaping elements so as to reversibly and controllably produce movement in at least one of said joints,
wherein a locking mechanism is provided for releasable locking two adjacent segments together, wherein the locking mechanism comprises an annular collar formed on an inner wall of the socket of a first segment, and one or more addressable controllers for resistively heating the annular collar;

wherein the collar is comprised of a shape memory alloy which recovers a memorized shape when it undergoes a phase transformation between a first state and a second state;

wherein the collar defines an inner diameter at the open end of the socket, and the collar has a diameter in said a first state which is smaller than a diameter of the collar in said second state; and wherein resistive heating of the collar by the addressable controllers causes the shape memory alloy of the collar to transform from one of said states to the other of said states.

2. The controllable robotic arm according to claim 1, wherein each of the segments comprises a ball at its first end and a socket at its second end, the sockets of the segments having a diameter sufficient to receive the balls of the segments.

3. The controllable robotic arm according to claim 2, wherein the balls and sockets have a hyperbolic shape.

4. The controllable robotic arm according to claim 1, wherein the segments are annular and are each provided with a central, axially extending aperture, the apertures of the segments aligning to form a central passage extending between a proximal end and a distal end of the articulable column, and wherein the compression element comprises an elongate tensioning element extending through said central passage and having a first end located at the proximal end of the articulable column and a second end fixed to one of the segments spaced from the proximal end of the articulable column, wherein the first end of the tensioning element is attached to said compression control mechanism, and wherein the compression control mechanism controls the tension in the tensioning element.

5. The controllable robotic arm according to claim 4, wherein the tensioning element is a cable and the compression control mechanism includes means for increasing tension in the cable.

6. The controllable robotic arm according to claim 4, wherein the tensioning element is comprised of a shape memory alloy and is shorter in its heated, austenitic state than in its cooler, martensitic state, and wherein the compression control mechanism includes means for heating the tensioning element to a temperature at which at least a portion of the shape memory alloy is transformed to austenite.

7. The controllable robotic arm according to anyone of claims 4 to 6, comprising at least two of said tensioning elements, a first one of which has a hollow interior, and a second one of which extends through the hollow interior of the first tensioning element, wherein the second tensioning element comprises a cable and has a length which is equal to or greater than a length of the first tensioning element.

8. The controllable robotic arm according to claim 7, wherein the first tensioning element has a variable modulus so as to be more flexible at its distal end.

9. The controllable robotic arm according to claim 1, including a plurality of said shaping elements extending along an outer surface of the articulable column.

10. The controllable robotic arm according to claim 9, wherein a plurality of the shaping elements comprises a hollow spring mounted between a pair of annular retaining plates, wherein one of the retaining plates is mounted to an end of a cylindrical communicating tube, and wherein the articulable column extends through said shaping elements.

11. The controllable robotic arm according to claim 10, wherein the retaining plates of each shaping element are connected together by cables at one or more points around their circumference, at least one of the cables being controlled by said compression control mechanism so as to produce an off-centre compression or expansion force in said spring and thereby cause bending of said shaping element.

12. The controllable robotic arm according to claim 10, wherein the shaping elements are rotatable about an axis of rotation which is parallel to the longitudinal axis of at least one of the segments.

13. The controllable robotic arm according to claim 10, wherein an inner diameter of the shaping elements is varied such that the shaping elements are nestable with one another, such that the coil spring of a first shaping element is received inside the cylindrical communicating tube of a second shaping element, and wherein bending of the spring of the first element causing bending of the tube of the second shaping element.

14. The controllable robotic arm according to claim 10, wherein the hollow spring is a coil spring or an expandable mesh spring.

15. The controllable robotic arm according to claim 1, wherein a plurality of said shaping elements are comprised of microelectronic mechanical devices (MEMS) and wherein the shape control mechanism comprises a plurality of addressable controllers attached to or embedded in said MEMS devices, a computer which controls actuation of said MEMS devices, and one or more conduits or a signal bus through which the MEMS devices are connected to said computer.

16. The controllable robotic arm according to claim 15, wherein each of the shaping elements comprises an element which is variable in shape and/or length, and which extends across at least one of said joints of the articulable column.

17. The controllable robotic arm according to claim 16, wherein each of the shaping elements is comprised of a material selected from electro-active polymers and shape memory alloys and either partly or completely surrounds said at least one joint.

18. The controllable robotic arm according to claim 1, wherein a proximal end of the robotic arm is connected to a telescoping member received within an articulating ball actuator.

19. The controllable robotic arm according to claim 1, wherein a distal end of the robotic arm is provided with a connector for attaching a tool.

20. The controllable robotic arm according to claim 1, wherein said robotic arm comprises two or more of said articulable columns joined end to end, wherein an electromagnetic connector is provided between the joined ends of the columns and is actuated during joining of the columns.

21. The controllable robotic arm according to claim 1, wherein said first state is an austenitic state and the second state is a martensitic state; and wherein heating of the collar to the austenitic state causes the collar to constrict and engage the outer surface of the ball of a second, adjacent segment.

22. The controllable robotic arm according to claim 21, wherein the locking mechanism further comprises an annular groove formed in a base portion of the ball of the second segment;

wherein the diameter of the collar in the martensitic state is greater than a maximum diameter of the ball; and wherein the diameter of the collar in the austenitic state is less than a diameter of a base portion of the ball, such that the collar, when heated to its austenitic state, becomes locked in the groove of the ball.

23. The controllable robotic arm according to claim 21, wherein each of the segments of the articulable column is provided with said locking mechanism, such that the locking mechanisms comprise the compression elements of the robotic arm,
    wherein the diameter of the collar in the martensitic state is less than a maximum diameter of the ball and greater than a diameter of the base portion of the ball;
    such that heating of the collar to its austenitic state causes the ball to be drawn into the socket, thereby compressing the joint between the ball and the socket.

24. The controllable robotic arm according to claim 1, wherein said first state is a martensitic state and the second state is an austenitic state; and wherein heating of the collar to the austenitic state causes the, collar to expand.

* * * * *